(12) United States Patent
Gupte et al.

(10) Patent No.: US 10,438,145 B2
(45) Date of Patent: Oct. 8, 2019

(54) ENGINEERING VALIDATION AND AUDIT TOOL INDEPENDENT OF DESIGN AND PRODUCT MANAGEMENT PLATFORMS

(71) Applicant: TATA TECHNOLOGIES PTE LIMITED, Singapore (SG)

(72) Inventors: Keyur Gupte, Pune (IN); Rupali Bhosale, Pune (IN)

(73) Assignee: Tata Technologies PTE Limited, Singapore (SG)

( * ) Notice: Subject to any disclaimer, the term of this patent is extended or adjusted under 35 U.S.C. 154(b) by 1004 days.

(21) Appl. No.: 14/737,206

(22) Filed: Jun. 11, 2015

(65) Prior Publication Data

US 2016/0283871 A1 Sep. 29, 2016

(30) Foreign Application Priority Data

Mar. 27, 2015 (IN) .......................... 1083/MUM/2015

(51) Int. Cl.
*G06Q 10/06* (2012.01)
*G06Q 30/00* (2012.01)

(52) U.S. Cl.
CPC ......... *G06Q 10/063* (2013.01); *G06Q 30/018* (2013.01); *G06Q 2220/10* (2013.01)

(58) Field of Classification Search
CPC . G06Q 10/063; G06Q 30/018; G06G 2220/10
See application file for complete search history.

(56) References Cited

U.S. PATENT DOCUMENTS

| | | | | |
|---|---|---|---|---|
| 6,230,066 B1 * | 5/2001 | Sferro | ................ | G05B 19/4097 345/419 |
| 6,944,580 B1 * | 9/2005 | Blume | ................ | G06F 17/5018 700/103 |
| 7,069,192 B1 * | 6/2006 | Freitag | .................... | G06F 17/50 700/182 |
| 7,134,096 B2 * | 11/2006 | Brathwaite | ............. | G06F 17/50 716/100 |

(Continued)

FOREIGN PATENT DOCUMENTS

EP 0985992 9/2004

OTHER PUBLICATIONS

IBM, ENOVIA MatrixOne 10.8 accelerates innovation by enabling collaboration throughout complex business and engineering processes United States Announcement 208-110, dated Apr. 29, 2008 (Year: 2008).*

(Continued)

*Primary Examiner* — Jay Hann
*Assistant Examiner* — Chuen-Meei Gan
(74) *Attorney, Agent, or Firm* — Wiley Rein LLP

(57) ABSTRACT

A quality validation tool in a form of a computer program, installable on a specific hardware and or workstations which supports industrial CAD tools and PLM tools, the quality validation tool is executable independent of CAD platforms, Non-CAD platforms and or PLM platforms, wherein an engineering information resides in a geometry extractor while a plurality of engineering rules reside in a check validator. The engineering information is encrypted and decrypted. The tool has capability to perform quality audit, while keeping CAD form and detailing unknown to auditor. Validation report with quality rating is generated.

9 Claims, 45 Drawing Sheets

(56) References Cited

U.S. PATENT DOCUMENTS

| | | | | |
|---|---|---|---|---|
| 7,280,948 B2* | 10/2007 | Duggirala | G05B 19/4097 | |
| | | | 700/103 | |
| 7,769,614 B2* | 8/2010 | Eichstaedt | G05B 15/02 | |
| | | | 705/7.11 | |
| 8,595,171 B2 | 11/2013 | Qu | | |
| 2003/0149498 A1* | 8/2003 | Rebello | G05B 19/4097 | |
| | | | 700/97 | |
| 2005/0071136 A1* | 3/2005 | Vredenburgh | G06F 17/5004 | |
| | | | 703/1 | |
| 2005/0281453 A1* | 12/2005 | Boyer | G05B 23/0216 | |
| | | | 382/141 | |
| 2006/0041502 A1* | 2/2006 | Blair | G06F 17/227 | |
| | | | 705/37 | |
| 2008/0154749 A1* | 6/2008 | D'hooghe | G06Q 10/087 | |
| | | | 705/28 | |
| 2008/0294587 A1* | 11/2008 | Qu | G06F 17/50 | |
| | | | 706/47 | |
| 2009/0326694 A1* | 12/2009 | Stephens | G06F 17/50 | |
| | | | 700/98 | |
| 2011/0264591 A1* | 10/2011 | Song | G06Q 10/06 | |
| | | | 705/300 | |
| 2013/0191461 A1* | 7/2013 | Batra | G06F 17/50 | |
| | | | 709/206 | |
| 2016/0110482 A1* | 4/2016 | Gupte | G06F 17/509 | |
| | | | 703/1 | |

OTHER PUBLICATIONS

JD "How to decide with criteria and weight" 2009 http://sourcesofinsight.com/how-to-decide-with-criteria-and-weight/ (Year: 2009).*

* cited by examiner

"PRIOR ART"

"PRIOR ART"

FIGURE -37

ENGINEERING VALIDATION AND AUDIT TOOL INDEPENDENT OF DESIGN AND PRODUCT MANAGEMENT PLATFORMS

The following specification particularly describes the invention and the manner in which it is to be performed.

FIELD OF THE INVENTION

The present invention relates to a tool for validation and audit of engineering information. The tool is engineering knowledge based. Particularly, the invention relates to a computer based validation and audit tool which is independent of a CAD (computer aided design) platform on which the product is designed and PLM (product life cycle management) or PDM (product data management) platform on which the product is managed.

BACKGROUND OF THE INVENTION

Components and assemblies of any products are commonly designed on established computer aided design platforms, abbreviated as CAD platforms. CATIA, which is a CAD software suite from Dassault Systèmes; NX, formerly known as NX Unigraphics or usually just U-G, a CAD software package originally developed by Unigraphics, now a Siemens Software; Inventor, developed by Autodesk, a 3D CAD software; are few examples amongst many more CAD platform. There are also several Product Lifecycle Management, abbreviated as PLM or Product Data Management, abbreviated as PDM software available. ENOVIA from Dassault Systèmes, Windchill originally from Windchill Technology Inc. now from PTC Inc. likewise are examples of PLM platforms. While products are modeled and developed on CAD platforms, the corresponding CAD as well as Non-CAD information, collectively called as engineering information is structurally kept in PLM platforms.

A great deal of experience and knowledge resides in any product development organization and its associates, but which is not readily known to individual engineers who design products. Organizations create knowledge based rules which are made available to product designers in the form of check lists or even computer driven systems. Patent No: EP0985992B1 comprehensively elaborates such art giving a host of engineering rules in the Figures. Systems exist for validating rules by reverse application, as disclosed in U.S. Pat. No. 8,595,171B2.

Many a time, product development Organizations use CAD system and PLM platforms from different software companies and in such a case, uploading and downloading to and from any CAD to any PLM may or may not be always possible. Patent publication No: US2011/0264591 A1 discloses art of integrating a heterogeneous design system and a PLM system, mainly for non-graphic data.

Persons skilled in the art know well that different CAD platforms have different differential advantages. Consequently, different organizations have preference for different CAD platforms as well as PLM platforms. For example, CATIA is generally a preferred CAD platform by automobile industry where more surface geometry needs to be handled, while ProE is seen to be popular in organizations indulged in core engineering products where less of surface geometry needs to be dealt with.

There are design houses across the world which undertake product development assignment for different organizations. These design houses deal with different CAD and PLM platforms as per preference and requirement of their clients. Such a scenario brings complex problem of deployment of organizational knowledge on different platforms matrix.

Even within an organization, situation of use of different CAD platforms and PLM is not ruled out.

There are situations when designs need to be audited based on company's guidelines and expertise, without disclosing the product details and CAD geometry.

There are no known software aided tools for validation and or audit of multi-platform based product designs.

OBJECTIVE

To invent a platform-independent software tool for validation of engineering details of any CAD model with respect to library of engineering rules.

To invent a platform-independent software tool for validation of non-CAD engineering details of any CAD model with respect to library of engineering rules.

To invent a platform-independent software tool for audit of engineering details with respect to library of engineering rules, without disclosing CAD geometry.

To invent a software tool for validation with respect to selected checks out of a library of engineering rules To invent a software tool for audit with respect to selected rules out of library of engineering rules To invent a software tool which generates quantitative quality rating for engineering validation and audit.

SUMMARY OF INVENTION

This invention is a computer operated system which is an engineering validation and audit tool, and which is independent of a design platforms and a product management platforms, deployable stand alone, or as a "plug-in" in a CAD platform, or as a "plug-in" in a PLM platform, and is installable on specific hardware and or workstations which support industrial CAD and PLM tools, example—workstation with 64 bit operating system, NVIDIA Quadro 4000 2 GB GFX Special, and upwards.

The engineering validation and audit tool, termed as "QRatr", comprises of:
 (1) A Standard Configurator
 (2) A Quality Validation
 (3) A Quality Audit The Standard Configurator stores a Neutral Universal Checks Library. These checks encompass an all-round knowledge and experience of an organization. It is this knowledge and experience which essentially distinguishes one organization from other. A disproportionately small illustrative list of checks is given here below, segregated in non-exhaustive categories.

Model Checks are geometric Checks for Part, Assembly or drawing and pertain to hygiene of design practices. Design Checks are logical checks that define or control the geometry of a design. These could be for Part, Assembly or drawing. Manufacturing Checks are the checks for ensuring part manufacturability. These are generally meant for Parts. Compliance Checks are the regulatory checks imposed by local authorities or design standards followed. Integrity Checks are the checks run to verify the data integrity especially when different data sources need to be in synchronization.

Persons skilled in the art well appreciate that such checks and rules run into several hundreds and dynamically change with the domain of the organization. If a standards library containing such checks is limited to be a CAD specific, then the applicability of an organization's knowledge is frustratingly constrained and limited.

The engineering validation and audit tool, termed as "QRatr", comprises of a Geometry Extractor and a Check Validator. An Interface file contains encrypted extract.

The CAD and Non-CAD specific interfaces read the engineering information from the respective application program interfaces of the specific CAD and Non-CAD platforms and pass on to Geometry Extractor in a proprietary neutral format. To carry out a design validation, the engineering validation and audit tool extracts engineering information through CAD specific geometry extractor by the Geometry extractor. Geometry extractor produces engineering information, termed as Geometry extract, in the form readable by human as well as computer. The geometry extract is then encrypted so as to generate encrypted extract using an encryption algorithm, generating ciphertext, as per known art, that can only be read if decrypted. The Check Validator decrypts the encrypted extract and then applies rules on the decrypted extract and generates a result which is available as Validation Report with Pass or Fail Stamp along with a quality rating based on accumulation of multiplication of the Pass Count and the weightage.

The platform independent engineering information resides in the geometry extract while the platform independent engineering rules reside and get processed in the check validator.

At times, design and engineering needs to be audited by independent agencies. The independent agency needs to ensure that rules and checks prescribed are indeed applied and the designs are validated. The audit agency may not be revealed the product details as such. Quality audit, executed as per the disclosed Engineering validation and audit tool ensures confidentiality. The auditor has access only on auditor side. The engineering information in the geometry extractor, in the form of interface file and which is encrypted extract, is only made available to the auditor through auditee module. The quality audit has a bifurcated tool comprising a first bifurcation, which is the auditee side and a second bifurcation which is the auditor's side, the first bifurcation comprising of the plurality of CAD specific interface; the plurality of NON-CAD specific interface; the Geometry Extractor; and the interface file; and the second bifurcation comprising of the interface file, the Check Validator; the Neutral Universal Checks Library and the validation report.

1. The Standard Configurator
2. The Quality validation
3. The Quality Audit

The standard configurator stores the set of checks, which non-exhaustively comprise of the model checks, the design checks, the manufacturing checks, the compliance checks, the integrity checks, et cetera, along with a weightage for each check and rule, and which encompass an all-round knowledge and experience of an organization, and which run into several hundreds. To perform quality validation and or quality audit at any time, one may not need the entire set of checks. The standard Configurator makes it possible to create a sub-set of rules or checks, called as "Neutral Standard" as per validation requirement. The required rules are selected and "dragged" in order to create neutral standard. While a specific check is selected and dragged, a guideline, which is pre-stored corresponding to each check, is displayed. The variable part is then edited for required expression of check. A weightage of the rules and the checks is editable so that an organisation has an option to assign importance and significance as demanded by product and business. The neutral standard is then uploaded in the target PLM platform.

To execute quality validation, the engineering quality and validation tool, which resides in each PLM, as a PLUG-IN, is invoked.

Under quality validation, three executions are possible.
(1) Check—Merely check the CAD model with respect to neutral standard and keep the model in "work in progress" mode in the PLM.
(2) Enforce—Change the CAD model if certain failures are automatically implementable, that is, enforceable, without intervention of design engineer
(3) Promote—Release the CAD file in the PLM as completed part for further engineering deployment.

Certain checks, when failed, need intervention by design engineer. On the other hand, there are possible failures which do not need design engineers' intervention and the quality validation has the capability to make or enforce required corrections. A Chamfer feature size; a Hole feature Diameter having a range of acceptable numeric values are illustrations of checks, which, when failed, need design engineers' intervention. Active material type allotted having a defined "string" value illustrates a check which, when failed, may be corrected by the engineering validation and audit tool itself. Each check is classified as enforceable or not enforceable.

The functional difference between quality validation and quality audit is that it is possible to keep the confidentiality of CAD form and fit of the product design in case of quality audit. The quality audit is executed in the first bifurcation which is the auditee side and the second bifurcation, which is the auditor's side.

The engineering quality and audit tool "QRatr" is also usable for non-CAD information, available in MS-EXCEL, MS-ACCESS, ERP or any other manner executable by computers. The process for quality audit of non-CAD information remains the same as that of the CAD information.

DESCRIPTION OF DRAWINGS

FIG. 9A-1 and FIG. 9A-2 gives, in the form of a flow diagram the steps in execution of "Check" option.

FIG. 9B-1 to FIG. 9B-4 gives, in the form of a flow diagram the steps in execution of "Enforce" option.

FIG. 9C-1 and FIG. 9C-2 gives, in the form of flow diagram, the steps in execution of "Promote" option.

FIG. 33 to FIG. 37 give illustrative screen views of the Quality audit for the non-CAD information.

DETAILED DESCRIPTION OF INVENTION

Abbreviations, Notations and Definitions

CAD—Computer Aided Design or Computer Assisted Design
CAD information—numeric information namely a dimension or a material property, or a non-numeric information namely a material name, et cetera, given in a CAD model of a part or an assembly
Non-CAD information—numeric information namely a part number or a material code, or a non-numeric information namely a material name, et cetera, given in a non-CAD file like MS-EXCEL, SAP.
Weightage—Relative importance or significance of a rule or check, quantified numerically.
Quality rating—Accumulation of number of Pass Results× Weightage
Engineering information—a CAD or a non-CAD information pertaining to a product design
PLM—Product Lifecycle Management or Product Management
PDM—Product Data Management or Product Management
SL1 . . . SL3—Standards Library, which is a list of knowledge based rules, in a form readable by a particular CAD platform
Audit or Engineering Audit—To validate engineering information without revealing design details and form to the auditor.
Neutral Universal Checks Library—A comprehensive list of knowledge based rules and checks, readable by platform independent Engineering Validation and audit Tool.
Neutral Standard—A sub-set of checks and rules specific to an assignment or project, derived from Neutral Universal Checks Library.
A bracketed number preceded by a comma refers to a step in the flow diagram.

The invention shall now be described with the aid of the drawings. Illustrations are built around a general component and such illustrations are merely to exhibit the invention and not limit the scope of this invention in any manner.

This invention is a computer operated system which is an engineering validation and audit tool, and which is independent of design platforms and product management platforms.

Our inventive engineering validation and audit tool is deployable stand alone, or as a "plug-in" in a CAD platform, or as a "plug-in" in a PLM platform, and is installable on specific hardware and or workstations which support industrial CAD and PLM tools, example—workstation with 64 bit operating system, NVIDIA Quadro 4000 2 GB GFX Special, and upwards.

Figure 1:
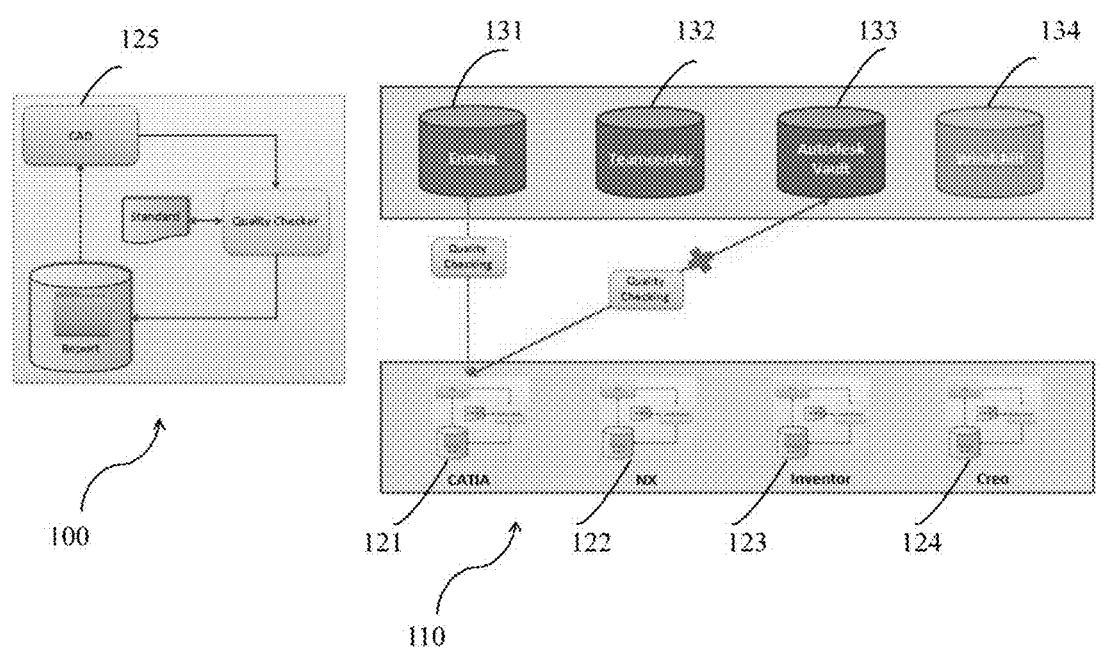
FIG. 1 gives a pictorial view of scenarios of the state of the prior art and its limitation.

FIG. 1 shows a first scenario (100) where an output which is a part or an assembly from a CAD platform (125) is validated with respect to a set of rules and a report is generated. There is no PLM platform or PDM platform in a first scenario (100). In a second scenario (110), an output which is a part or an assembly from a CAD platform (121), illustratively a CATIA platform here, is validated with respect to a set of rules and a validated part or assembly is made to reside in a PLM (131), illustratively Enovia here.

As FIG. 1 also shows, prior art does not envisage storing of a Quality Validation output of the CAD platform (121) which is illustratively the CATIA platform here, in any a random PLM platform (133), which is illustratively an Autodesk Vault platform here even though the CAD platform (121) to a PLM platform (133) or vice-versa data upload is supported by the PLM platform (133).

Figure 2:
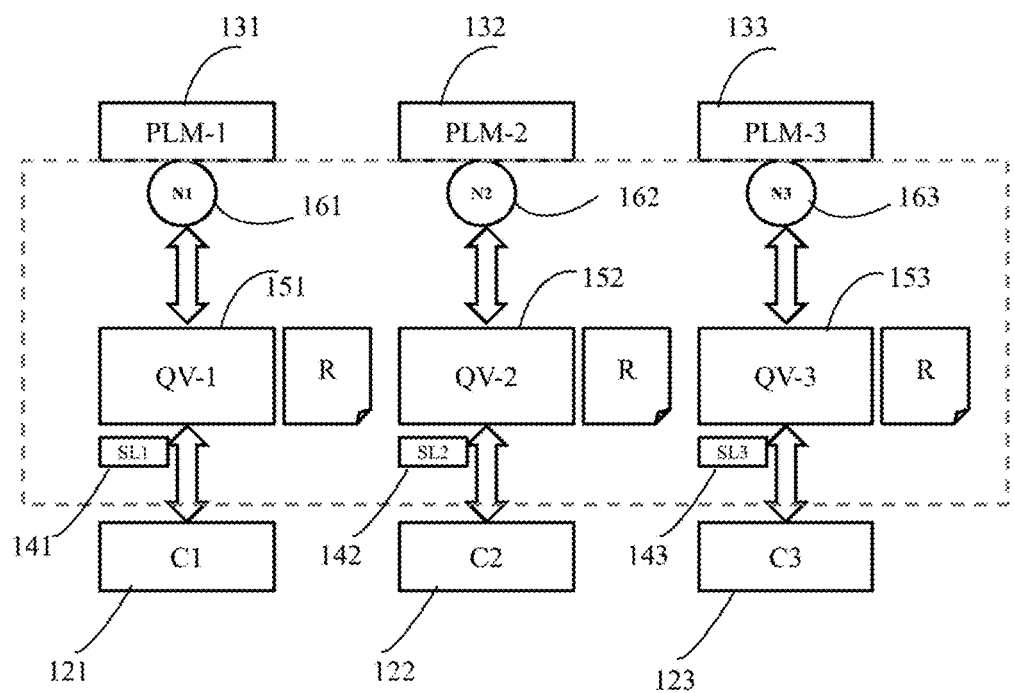
FIG. 2 shows the prior art through a box diagram.

The box diagram in FIG. 2 further explains the prior art which is a platform dependent validation. C1 (121), C2 (122) and C3 (123) are different CAD platforms like CATIA, NX, INVENTOR illustratively. SL1 (141), SL2 (142) and SL3 (143) are illustratively different platform specific standards libraries. QV-1 (151), QV-2 (152) and QV-3 (153) are platform specific quality validation tools while N1 (161), N2 (162) and N3 (163) are PLM specific interfaces. As is evident, the process of validation is possible only with a specific CAD platform and is reside-able only in a specific PLM platform.

Figure 3:
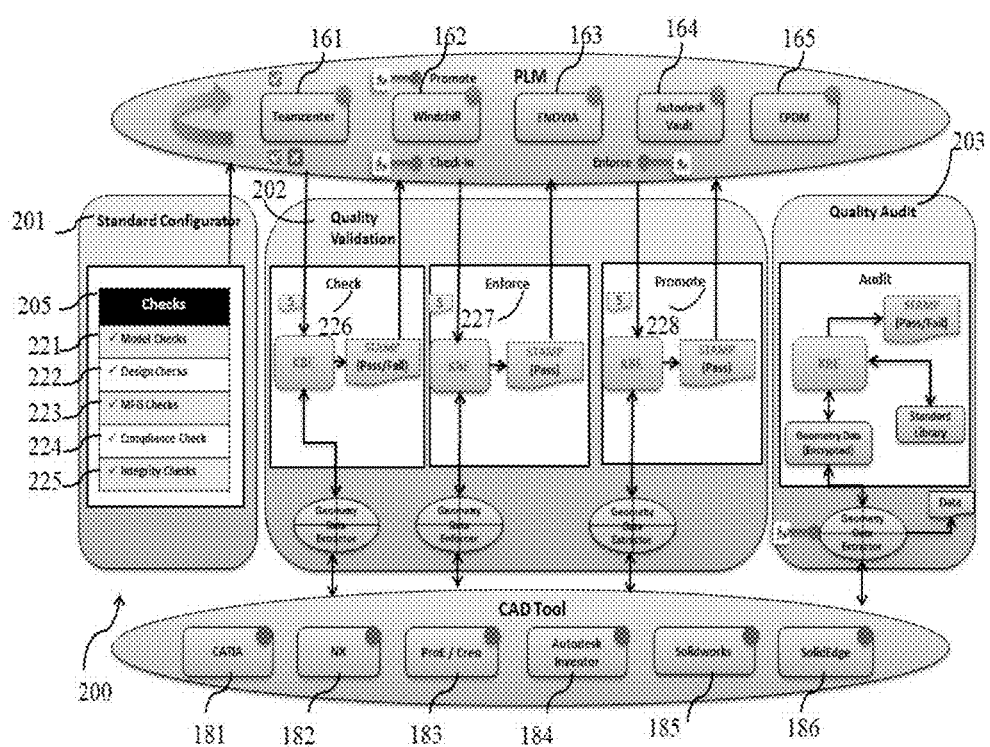
FIG. 3 is a pictorial view of an engineering validation and audit tool as per this invention.

FIG. 3 shows an overview of an engineering validation and audit tool (200), termed as "QRatr" as per this invention. The engineering validation and audit tool (200) comprises of:

(1) A Standard Configurator (201)
(2) A Quality Validation (202)
(3) A Quality Audit (203)

The Standard Configurator (201) stores a Neutral Universal Checks Library. These checks encompass an all-round knowledge and experience of an organization. It is this knowledge and experience which essentially distinguishes one organization from other. A disproportionately small illustrative list of checks is given here below, segregated in non-exhaustive categories.

Model Checks (221) are Geometric Checks for a Part, an Assembly or a drawing and pertain to hygiene of design practices, like:
a) Unused Sketches Forbidden
b) Unconstrained Sketch Geometry Forbidden
c) Component Degrees of Freedom
d) Fillet Feature Size
e) Hole Feature Diameter
f) Suppressed Features Forbidden
g) Electrical Property Value Correct
h) Composite Material Library
i) Compare Open Body To Part Name
j) Compare Element To Open Body
k) View Render Style Required
l) Axis System Active Forbidden
m) Drawing Dimension Value Override Design Checks (222) are logical checks that define or control the geometry of a design. These could be for Part, Assembly or drawing. Example:
a) Thickness=0.13 mm
b) Depth=Thickness*1.2 mm
c) Scale=1:7.5 (mm)
d) General Tolerance=±1

A generic logical check illustratively is:

$$Y=[(aX+bY)*cZ]^n$$

Numeric/expressions shown in italics, illustratively a, b, c and n, are variable part of design checks and generally vary from application to application and also from organisation to organisation.

Manufacturing Checks (223) are the checks for ensuring part manufacturability. These are generally meant for Parts. Examples:
a) Flat Bottom Hole Forbidden
b) Hole Accessibility
c) Hole Depth Diameter Ratio
d) Hole Entry Not Normal
e) Hole Not Created Through Hole Feature
f) Partial Hole Engagement
g) Minimum Distance Between Cutouts
h) Minimum Slot Width
i) Uniform Wall Thickness Compliance Checks (224) are the regulatory checks imposed by local authorities or design standards followed. Example—EURONCAP for automotive designs for Europe. Such checks are illustratively:
a) Bumper Reference Lines Check
b) Bumper Corners Check
c) Bonnet Side Reference Line Check
d) Part Material Allowed Per Name
e) Part Material Applied Required
f) Part Material Applied Forbidden
g) Part Material Analysis Properties Required
h) Part Material Properties Up to Date Integrity Checks (225) are checks run to verify data integrity especially when different data sources need to be in synchronization. For example, a bill of material created in a two dimensional drawing should match with a corresponding bill of material in an Enterprise Resource Planning suite. Thus such checks are typically:
a) Verify File Revision with PLM
b) Verify BOM with SAP
c) Verify Cost with MS-EXCEL Persons skilled in the art well appreciate that such checks and rules run into several hundreds and dynamically change with the domain of the organization. If a standards library containing such checks is limited to be a CAD specific, then the applicability of an organization's knowledge is frustratingly constrained and limited.

Quality validation (202) as per this disclosure comprises of following executions:
Check (226)
Enforce (227)
Promote (228)
This shall be described later below.

Figure 4:
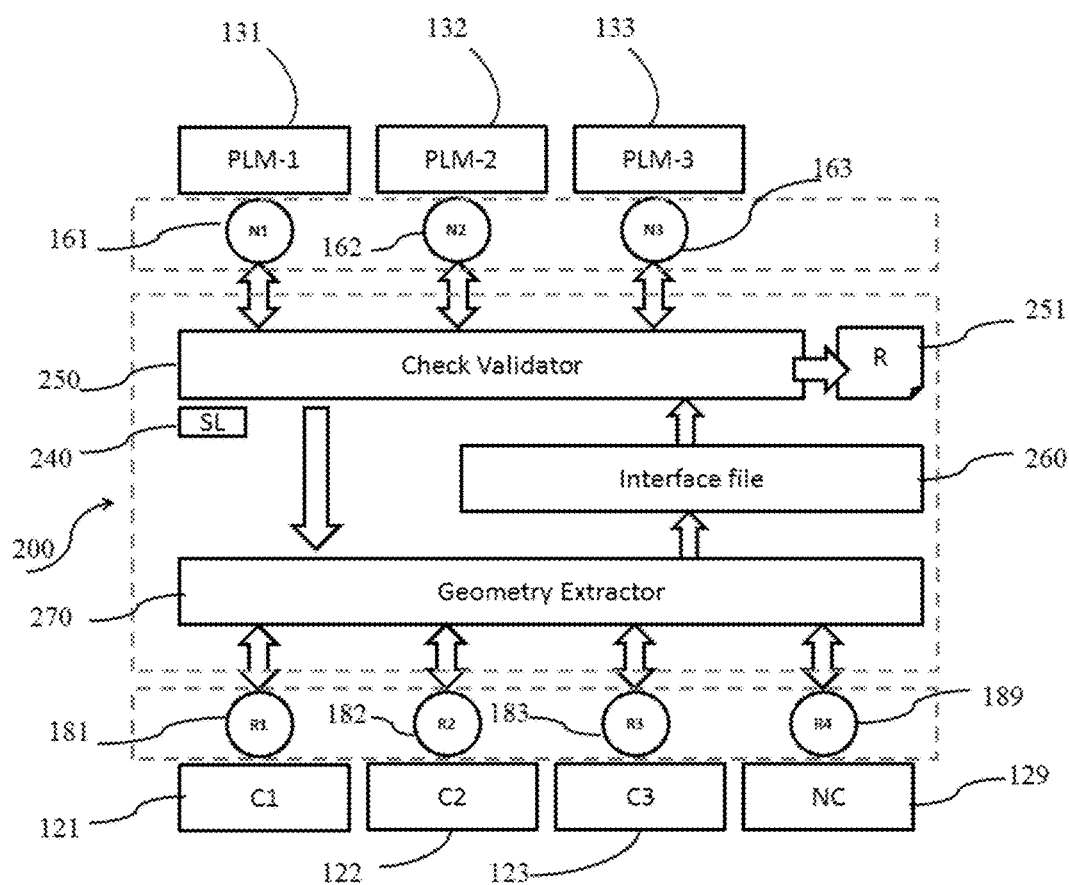
FIG. 4 shows the engineering validation and audit tool as per this invention through a box diagram.

As shown in box diagram in FIG. 4, the engineering validation and audit tool (200) as per this invention is independent of the CAD platforms (121, 122, 123 . . . ), the Non-CAD platforms (129) as well as the PLM platforms (131, 132, 133 . . . ).

The engineering validation and audit tool (200), termed as "QRatr", comprises of a Geometry Extractor (270) and a Check Validator (250). An Interface file (260) contains an encrypted extract (280). R1 (181), R2 (182) and R3 (183) are CAD specific interfaces. R4 (189) is a NON-CAD specific interface. The box diagram in FIG. 4 shows three or four CAD/non-CAD platforms and PLM platforms illustratively; however there is no such limitation of the engineering validation and audit tool (200) and the invention as per this disclosure can cater to any number of CAD and PLM/PDM platforms.

Figure 5:
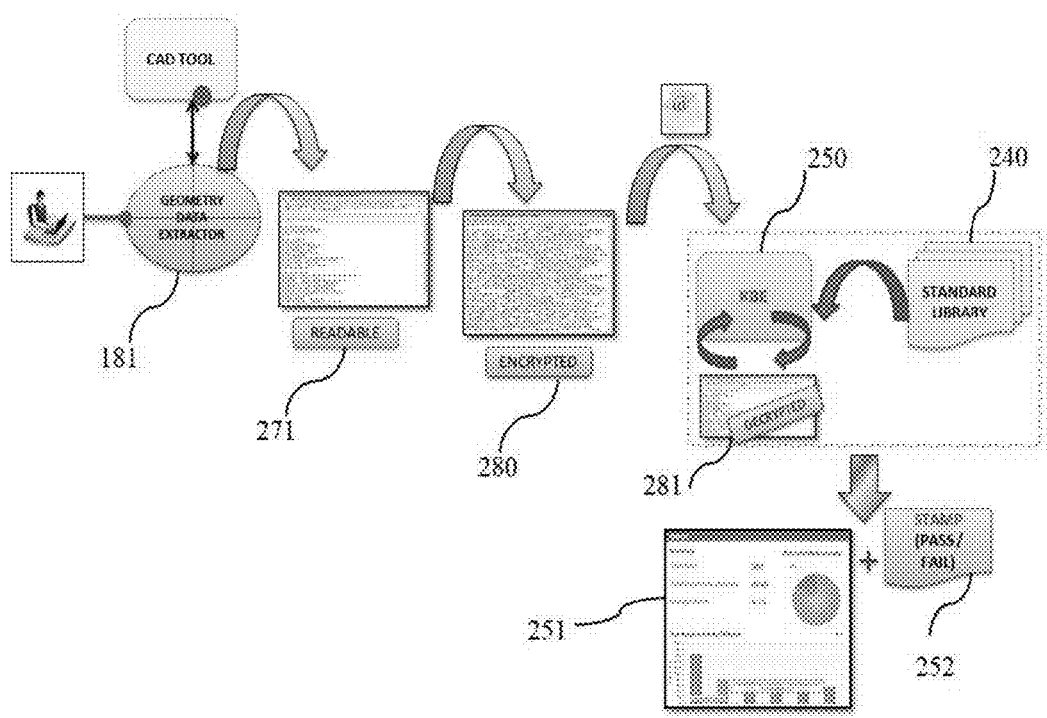
FIG. 5 shows an execution steps as per the engineering validation and audit tool.
Figure 32:
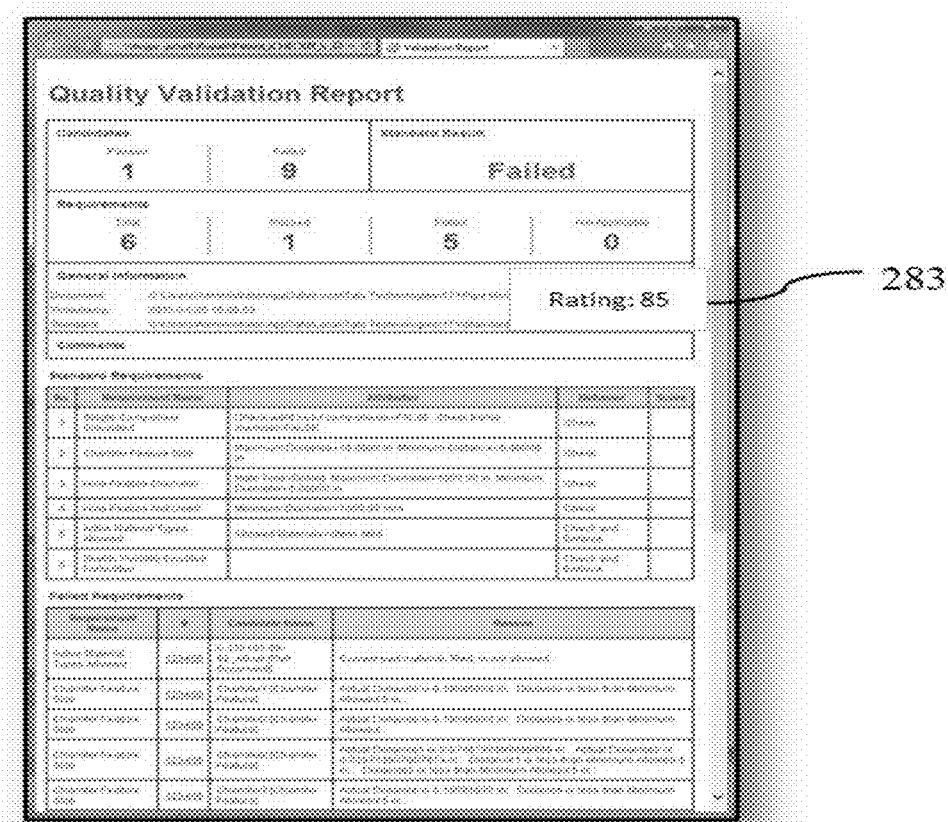
Figure 33:
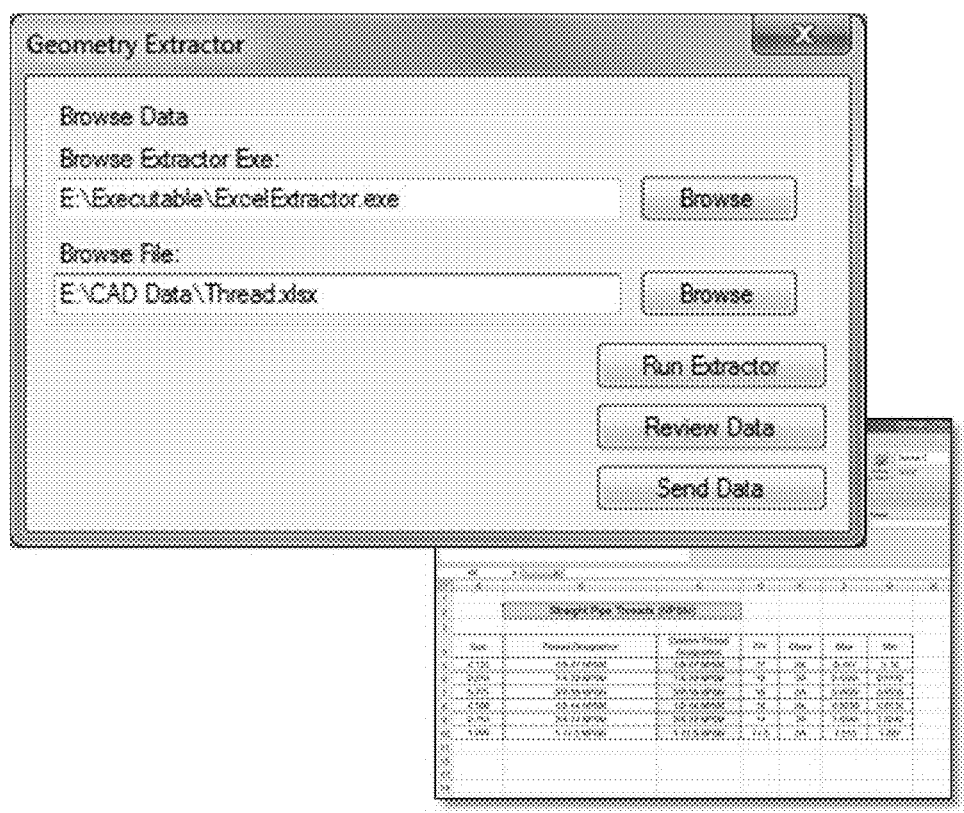
Figure 34:
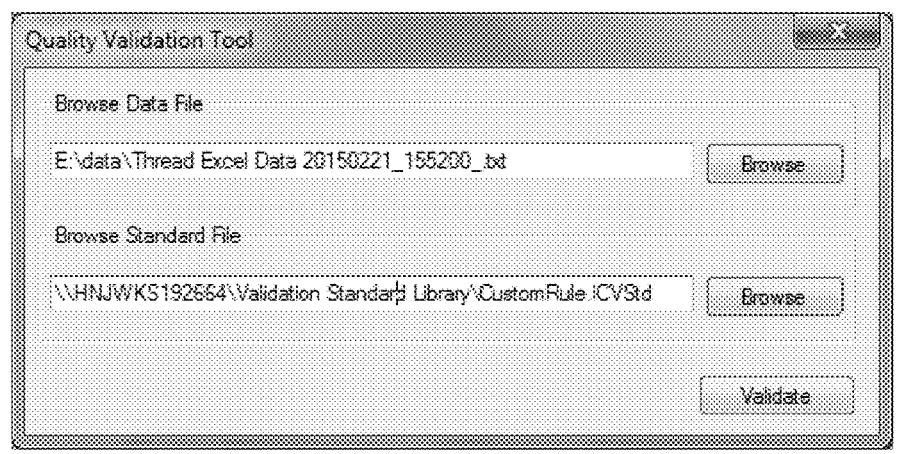
Figure 35:
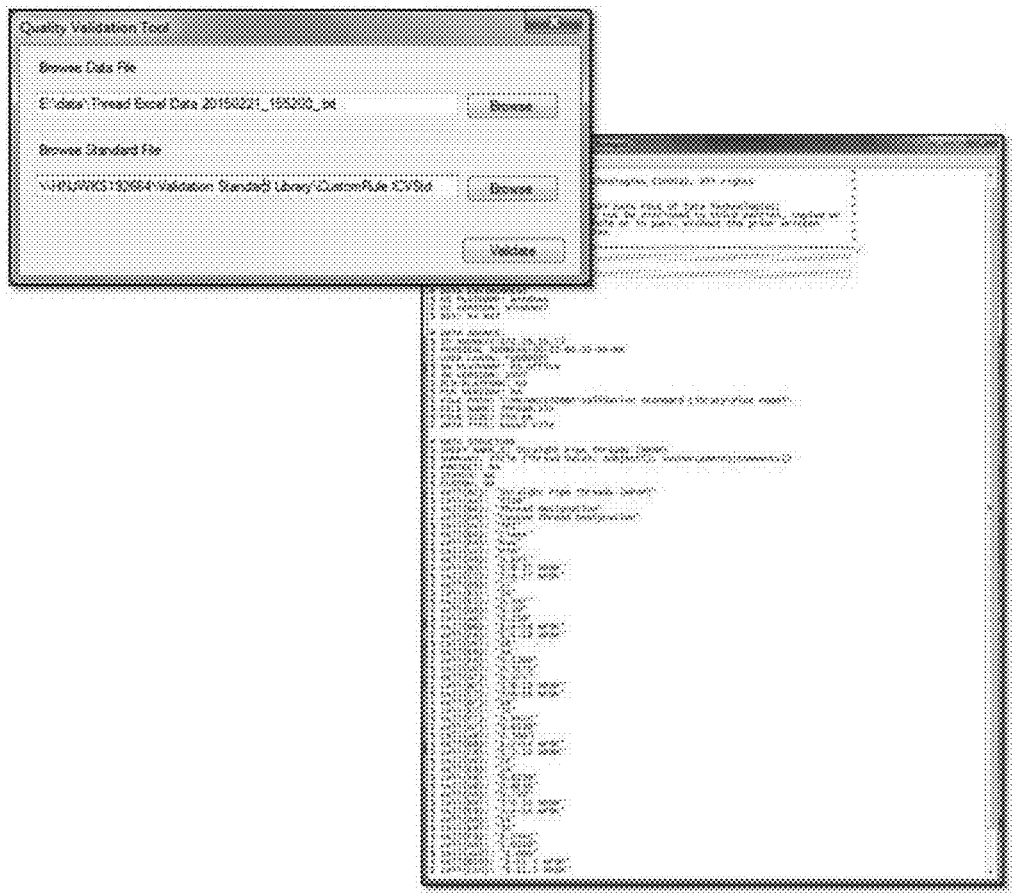
Figure 36:
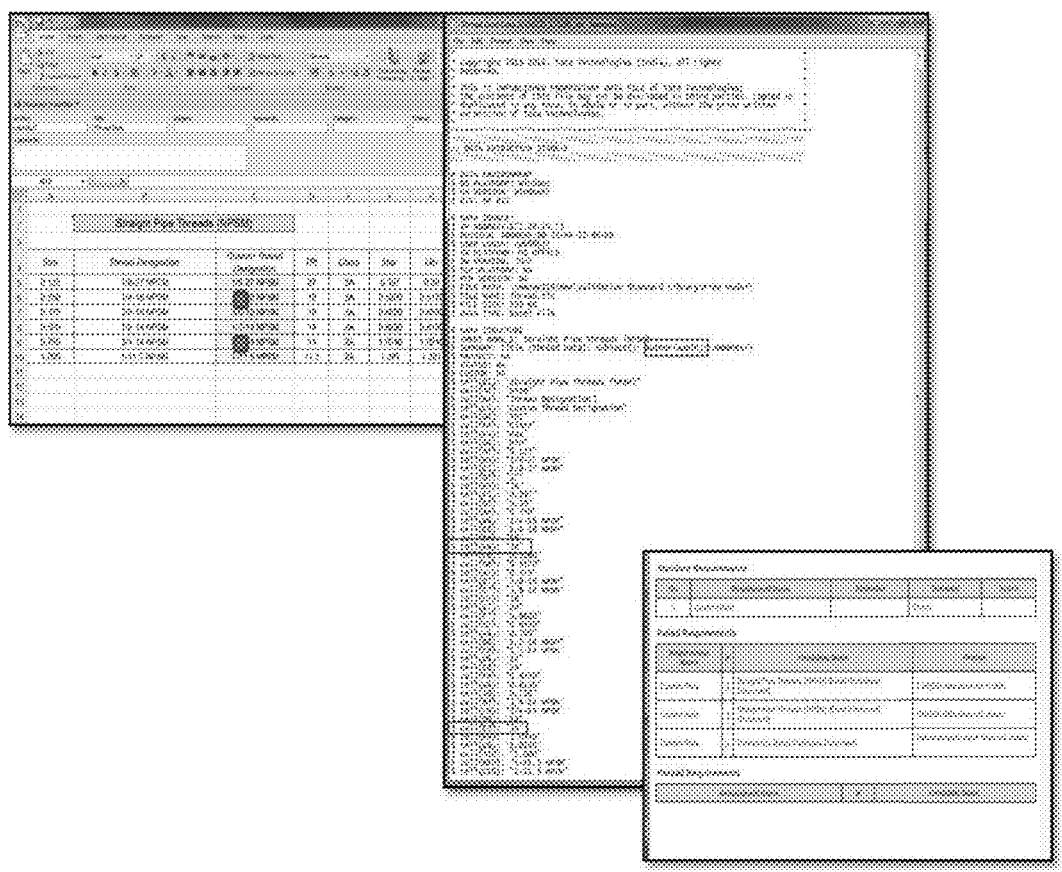
Figure 37:
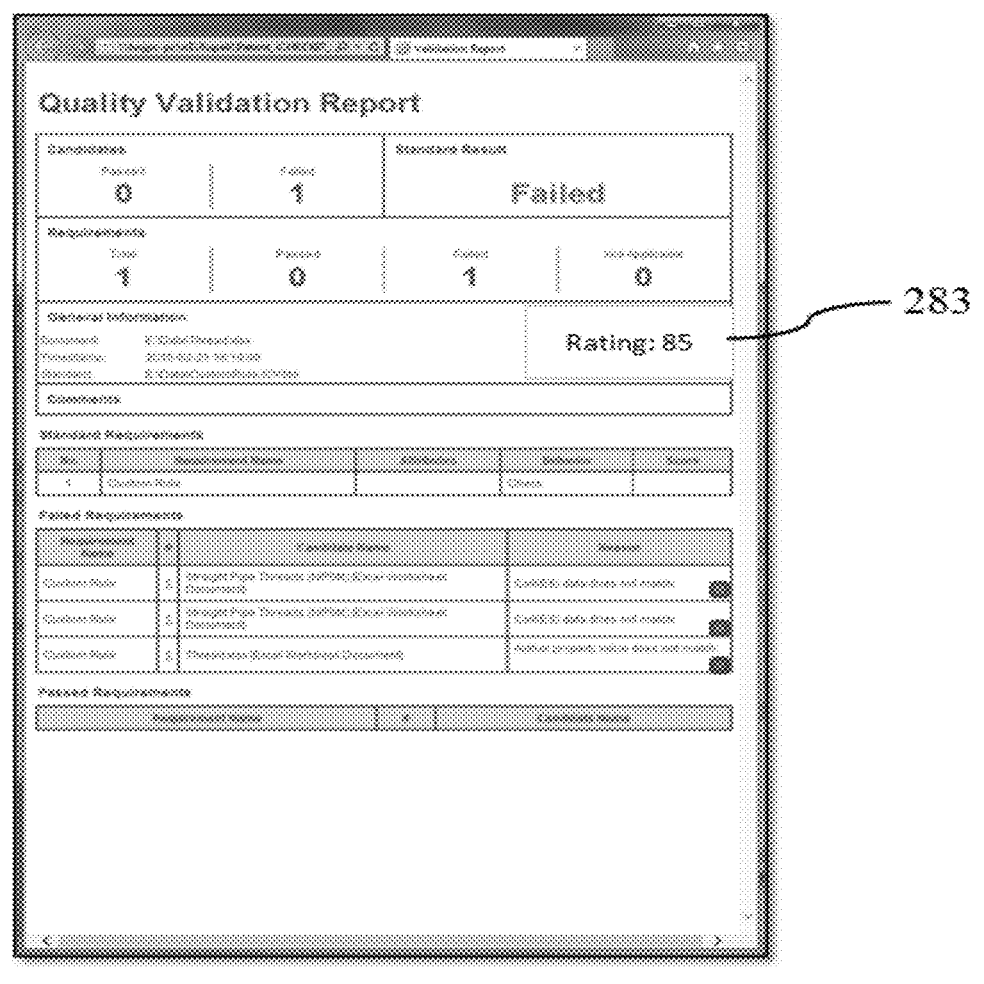

The CAD specific interfaces and the Non-CAD specific interfaces R1 (181), R2 (182), R3 (183), R4 (189) . . . read the engineering information from the respective application program interfaces of the specific CAD platforms and the specific Non-CAD platforms and pass on to the Geometry Extractor (270) in a proprietary neutral format, and such engineering information is platform independent. As shown in FIG. 4 and FIG. 5, to carry out design validation, the engineering validation and audit tool (200), extracts the engineering information through the Geometry extractor (270). The Geometry extractor (270) produces the engineering information, termed as a Geometry extract (271), in the form readable by a human as well as a computer. The geometry extract (271) is then encrypted so as to generate an encrypted extract (280) using an encryption algorithm, generating a ciphertext, as per known art, that can only be read if decrypted. The Check Validator (250) decrypts the encrypted extract (280) and then applies rules on the decrypted extract (281) and generates a result which is available as a Validation Report (251) with a Pass or Fail Stamp (252) along with a quality rating (253) as shown in FIG. 32 and FIG. 37 based on accumulation of multiplication of the Pass Count and the weightage.

The platform independent engineering information resides in the geometry extract while the platform independent engineering rules reside in the check validator. Example, referring to FIG. 17:
If a diameter (11) of a first end=20 cm, and a diameter (12) of a second end=15 cm; and if the diameter (11) should by greater than 1.1 times the diameter (12), then
20 cm and 15 cm are engineering information.
"These are diameters" is an engineering information
Diameter (11)>1.6*diameter (12) is an engineering rule As an illustration:—Conservatively, a general automobile may have approximately 30,000 parts or assemblies and each part may have 50 to 10,000 engineering information, depending on part complexity. The permutation of checks and rules with encrypted engineering information, not to ignore the variable elements of checks and weightages, is the amount of logical information that the disclosed invention encounters, on which the performance and reliability of a product depends. One skilled in the art knows that a typical 8 to 16 character alphanumeric encrypted password takes noticeable time to get validated and this thus amply explains the hardware limitation and minimum hardware requirement basis.

Figure 6:
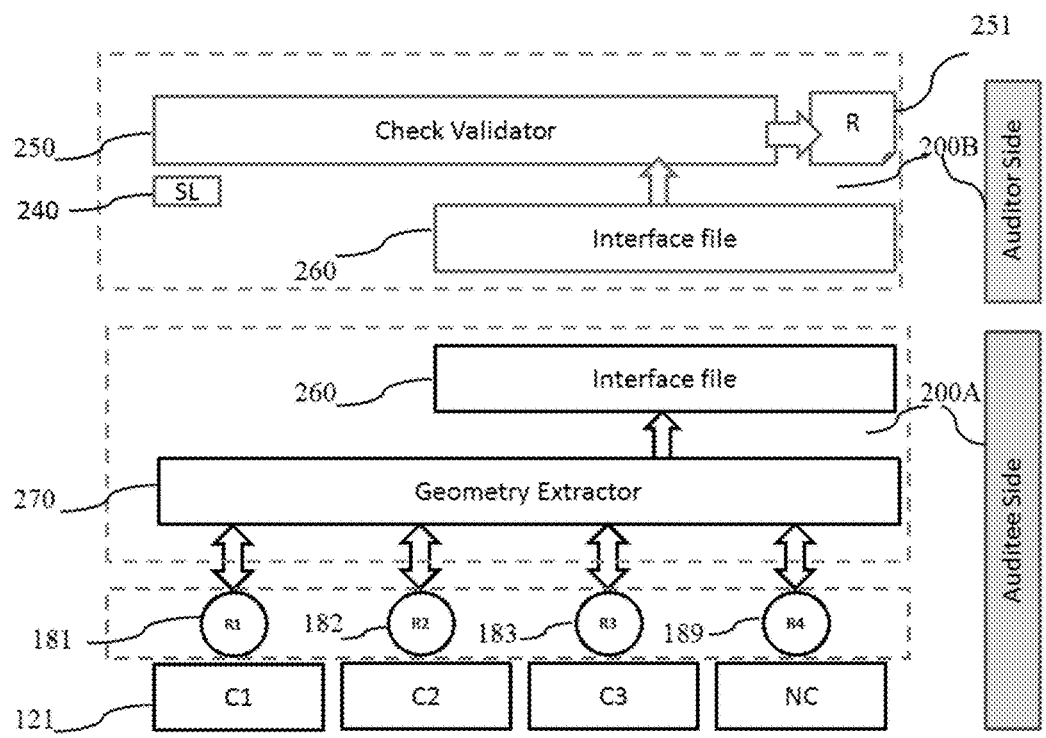
FIG. 6 shows an audit feature of the engineering validation and audit tool.

At times, design and engineering needs to be audited by independent agencies. The independent agency needs to ensure that rules and checks prescribed are indeed applied and the designs are validated. The audit agency may not be revealed the product details as such. Quality audit (203), executed as per the disclosed Engineering validation and audit tool (200) ensures confidentiality. As shown in FIG. 6, to carry out quality audit (203), the auditor has access only on auditor side (200B). The engineering information in the geometry extractor (270), in the form of interface file (260) and which is encrypted extract (280) as shown in FIG. 5, is only made available to the auditor through auditee module (200B). The quality audit has a bifurcated tool comprising a first bifurcation, which is the auditee side (200A) and a second bifurcation which is the auditor's side (200B), the first bifurcation comprising of the plurality of CAD specific interface (181, 182, 183 . . . ); the plurality of NON-CAD specific interface (189); the Geometry Extractor (270); and the interface file (260); and the second bifurcation comprising of the interface file (260), the Check Validator (250); the Neutral Universal Checks Library (240) and the validation report (251)

FIG. 7 to FIG. 10 describes the engineering validation and audit tool (200) through flow diagrams, while FIG. 11 to FIG. 37 correspondingly describes the invention through screen views and illustration.

Figure 7:
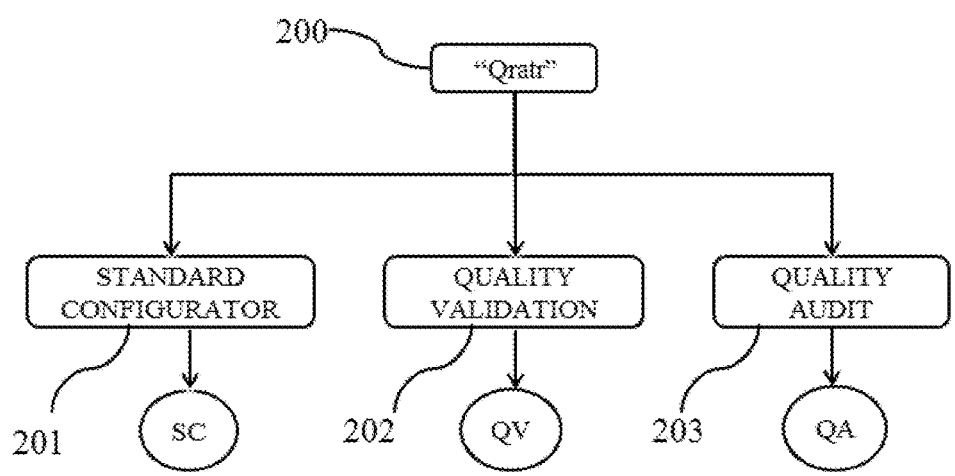
FIG. 7 gives in the form of a flow diagram, execution possibilities of the engineering validation and audit tool.
Figure 8:
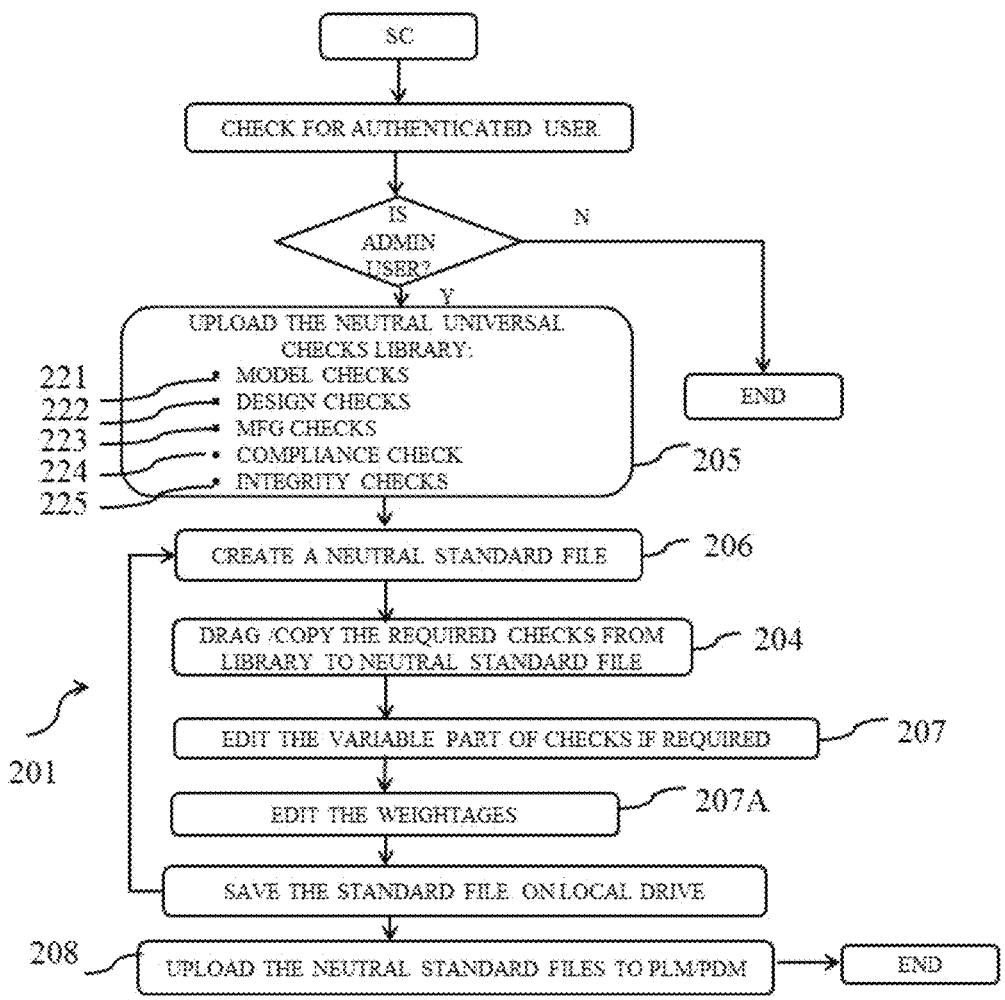
FIG. 8 gives in the form of a flow diagram, steps in execution of a standard configurator.

As shown in FIG. 7, the engineering validation and quality tool (200) has three significant executions:
1. The Standard Configurator (201)
2. The Quality validation (202)
3. The Quality Audit (203)

FIGS. 8, 11, 12 and 13 describe and illustrate Standard Configurator (201). The standard configurator (201) stores the set of checks (205), which non-exhaustively comprise of the model checks (221), the design checks (222), the manufacturing checks (223), the compliance checks (224), the integrity checks (225), et cetera, along with a weightage for each check and rule, and which encompass an all-round knowledge and experience of an organization, and which run into several hundreds. To perform quality validation (202) and or quality audit (203) at any time, one may not need the entire set of checks. The standard Configurator (201) makes it possible to create a sub-set of rules or checks, called as "Neutral Standard" (206) as per validation requirement. The required rules are selected and copied or "dragged" in order to create a neutral standard (206). While a specific check is selected and dragged, a guideline (209), which is pre-stored corresponding to each check, is displayed. The variable part is then edited for required expression of check (207). A weightage of the rules and the checks is editable so that an organisation has an option to assign importance and significance as demanded by product and business. The neutral standard (206) is then uploaded in the target PLM platform (208).

In other words, execution of the standard configurator comprises the steps of:
a. Uploading the library of checks, (205)
b. Creating a neutral standard file, (206)
c. Selecting and "dragging" the required checks into Neutral standard file, (204)
d. Editing the variable part of checks, (207)
e. Editing the weightages (207A)
f. Uploading the neutral standard file to PLM, (208)

Figure 14:
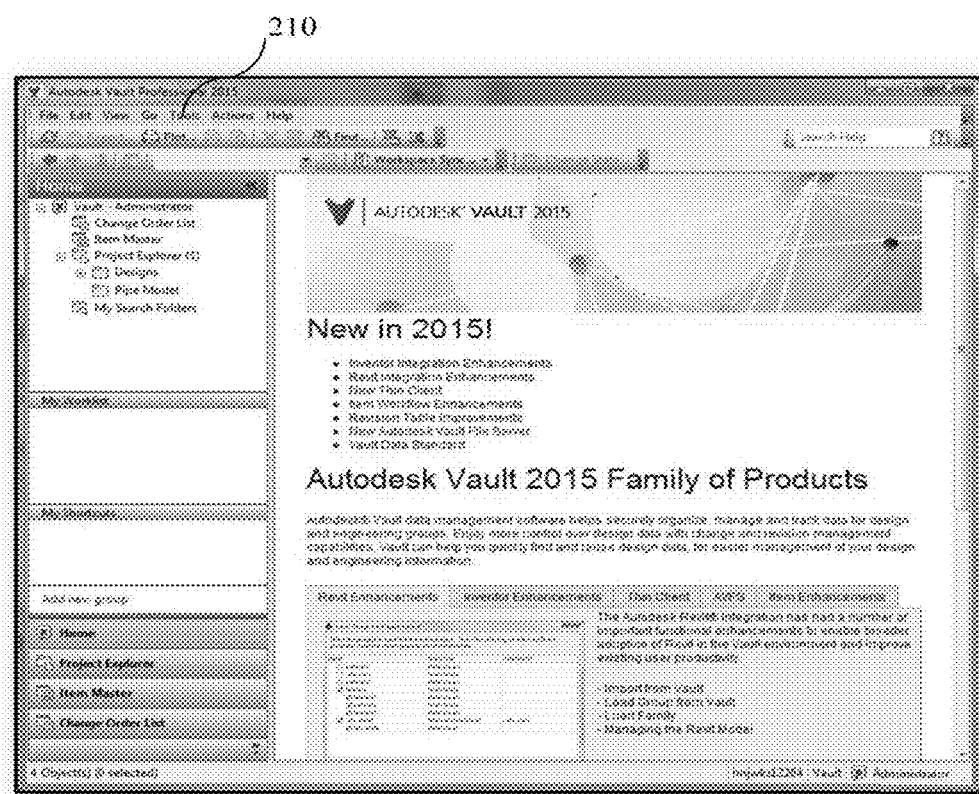
FIG. 14 to FIG. 28 give illustrative screen views of the Quality Validation so as to illustrate "Check", "Enforce" and "Promote" executions.
Figure 15:
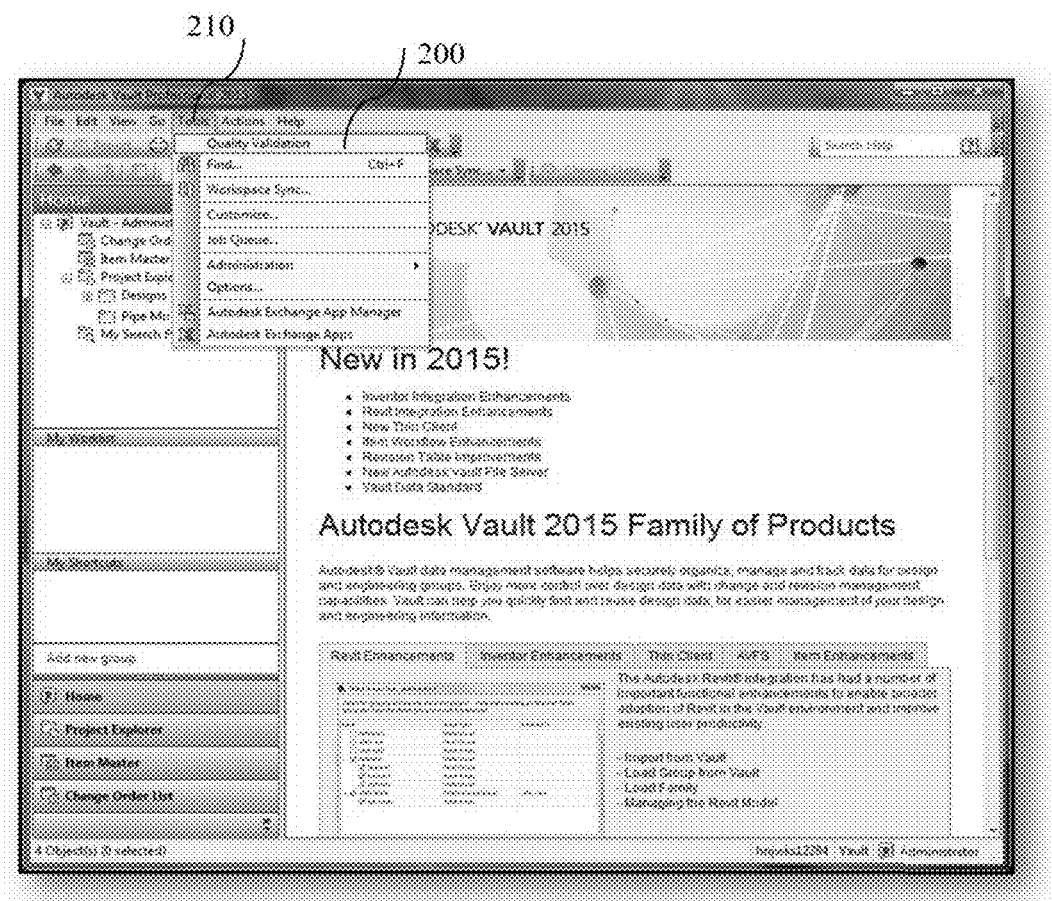
Figure 16:
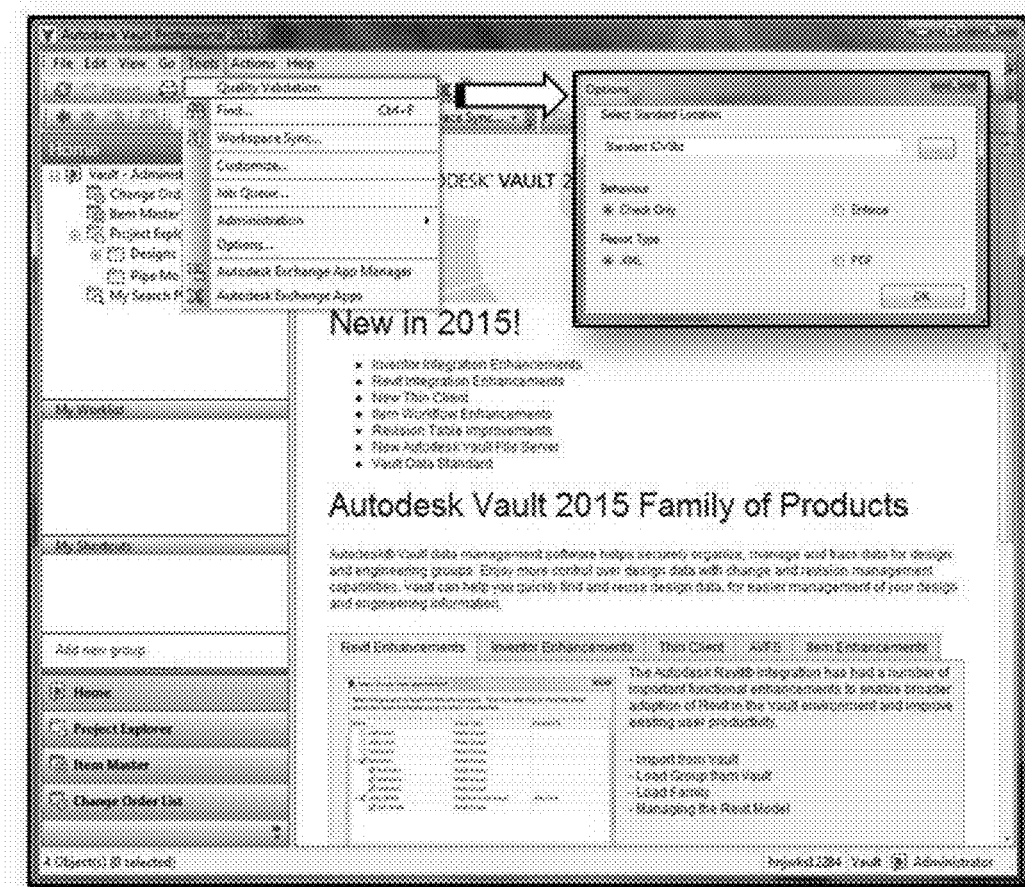

FIGS. 9, 9A, 9B, 9C and FIGS. 14 to 28 describe and illustrate Quality validation (202). To execute quality validation (202), the engineering quality and validation tool (200), which resides in each PLM (131, 132, 133 . . . ) under TOOLs (210) as shown in FIG. 14, as a PLUG-IN, is invoked. Autodesk Vault is illustratively taken here as one of the known PLM platforms.

Figure 9:
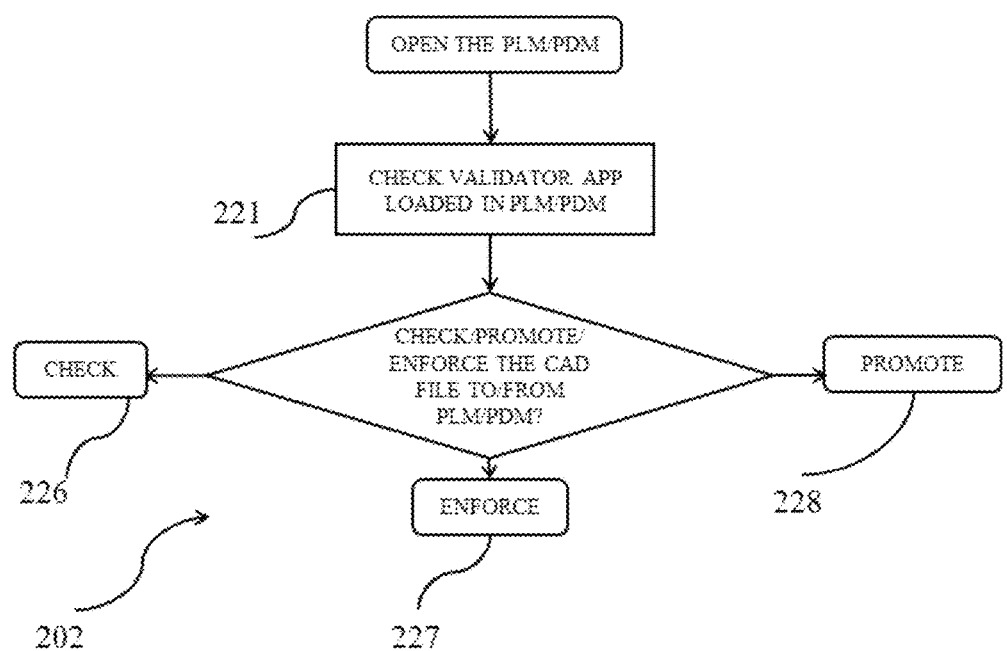
FIG. 9 gives in the form of a flow diagram, options of a quality validation.

Under quality validation, three actions are possible as shown in FIG. 9.
(1) Check (226)—Merely check the CAD model with respect to neutral standard and keep the model in "work in progress" mode in the PLM.
(2) Enforce (227)—Change the CAD model if certain failures are automatically implementable, that is, enforceable, without intervention of design engineer
(3) Promote (228)—Release the CAD file in the PLM as completed part for further engineering deployment.

Figures 1, 9A:
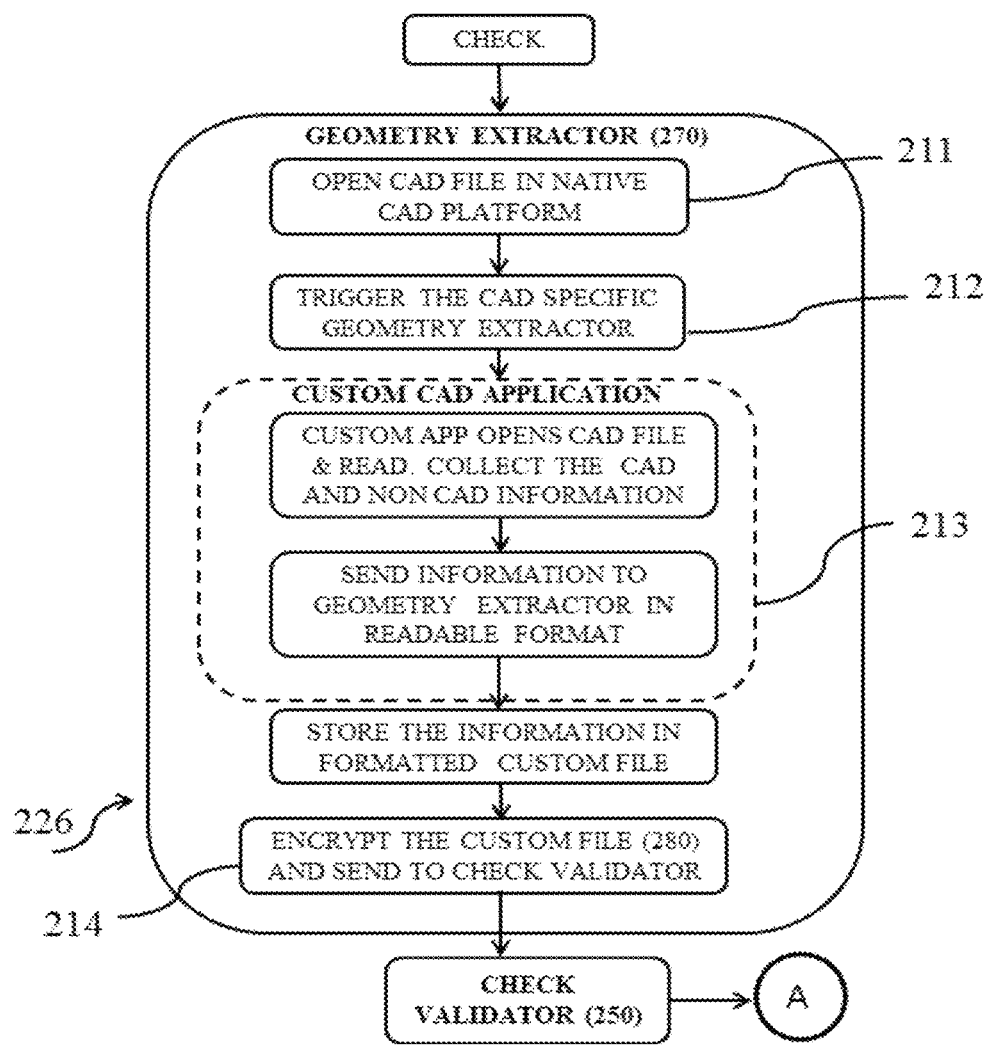
Figures 2, 9A:
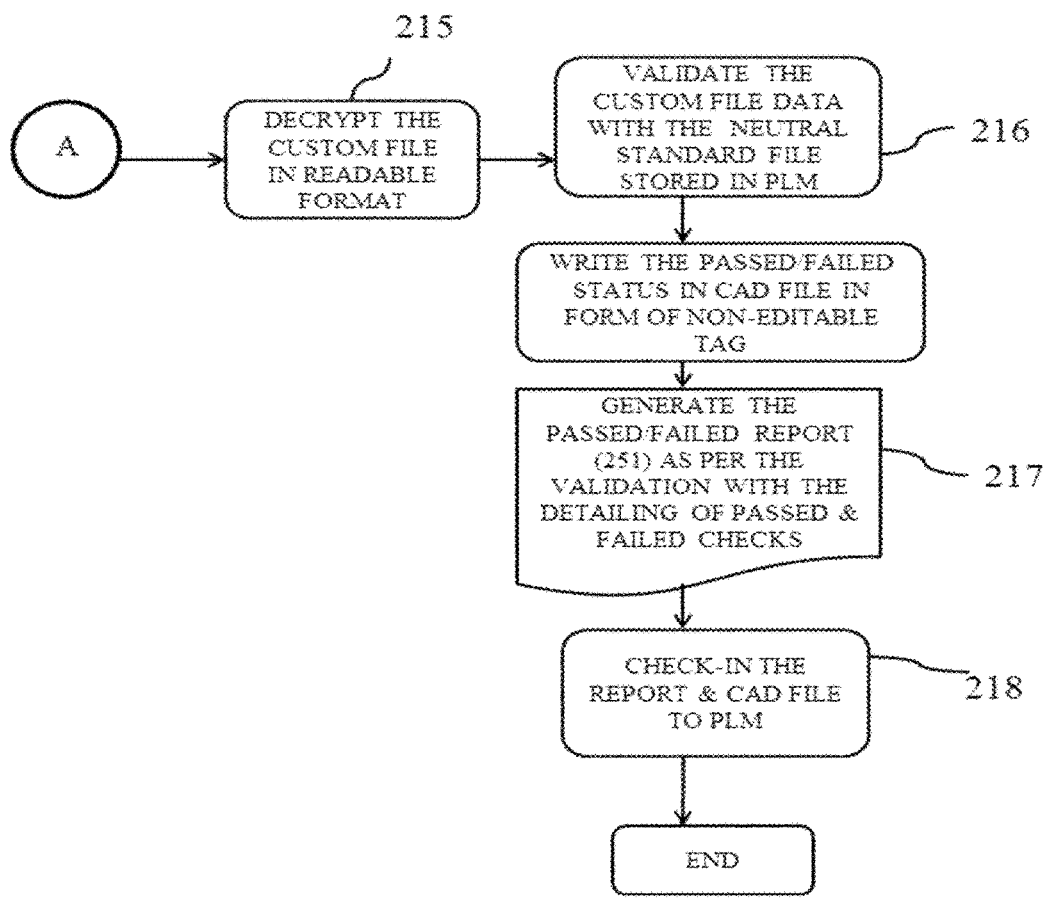
Figure 17:
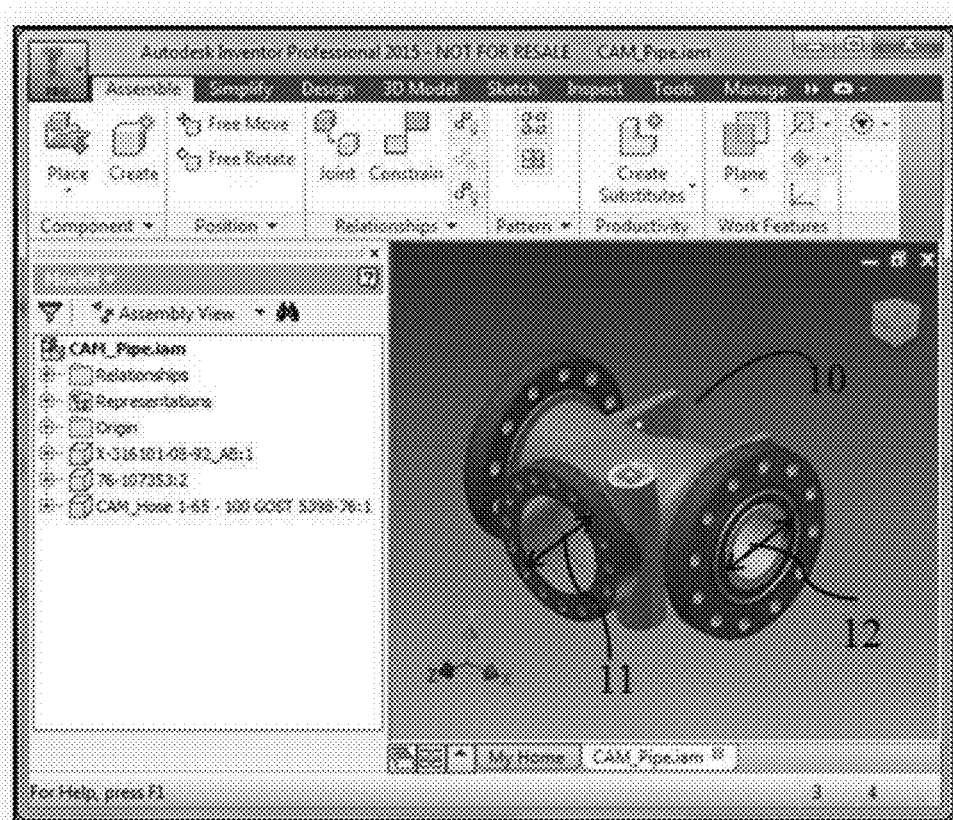
Figure 18:
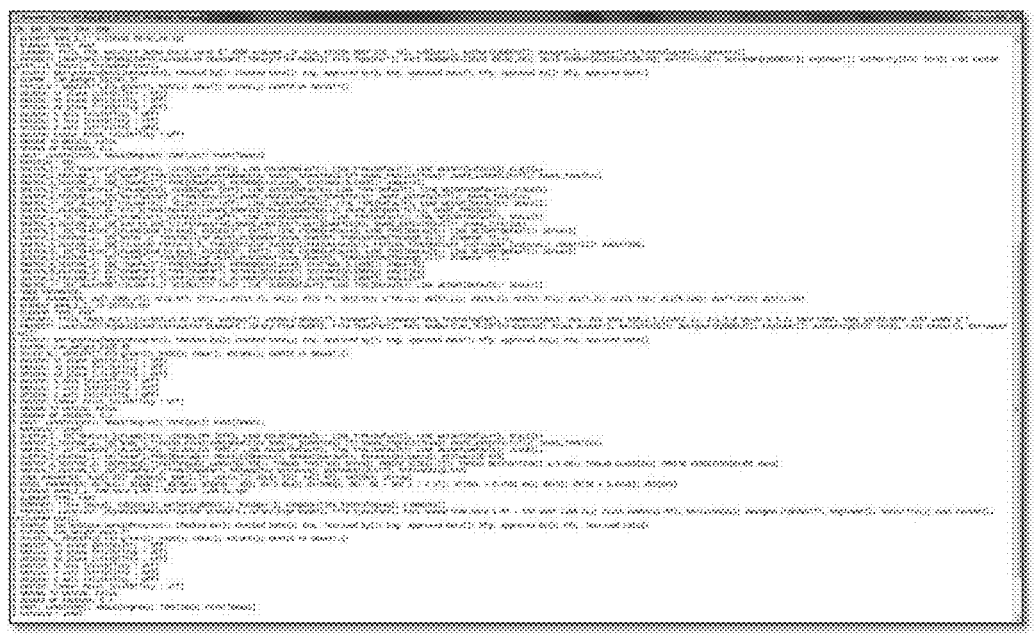
Figure 19:
Figure 20:
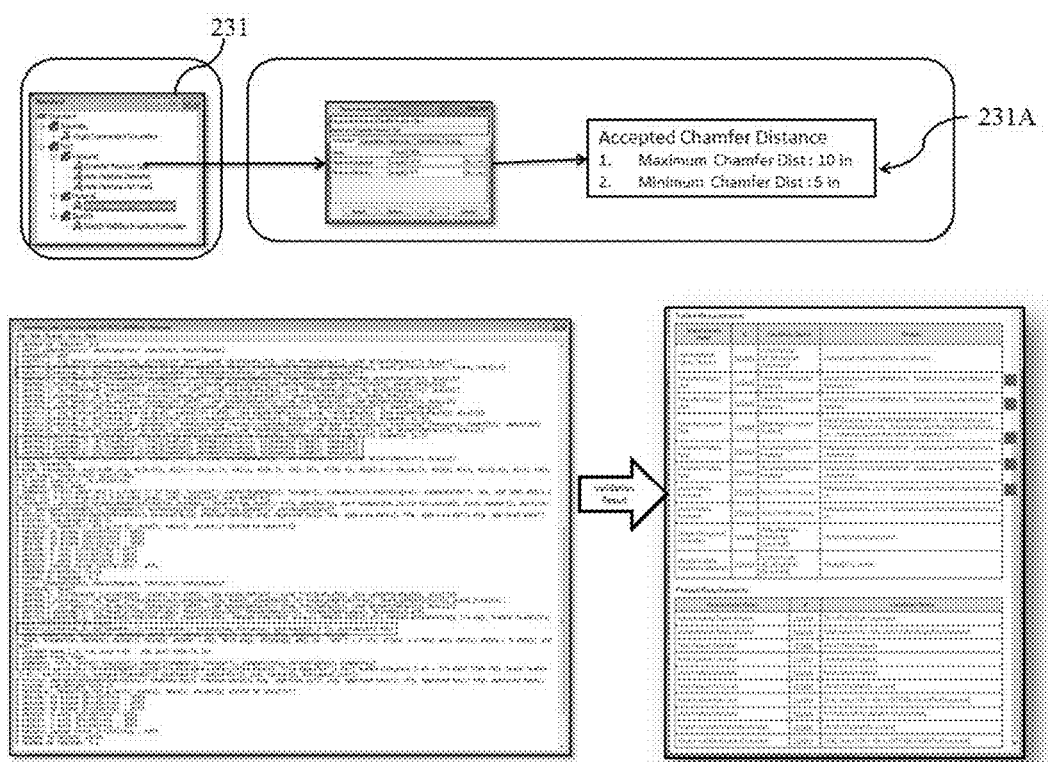
Figure 21:
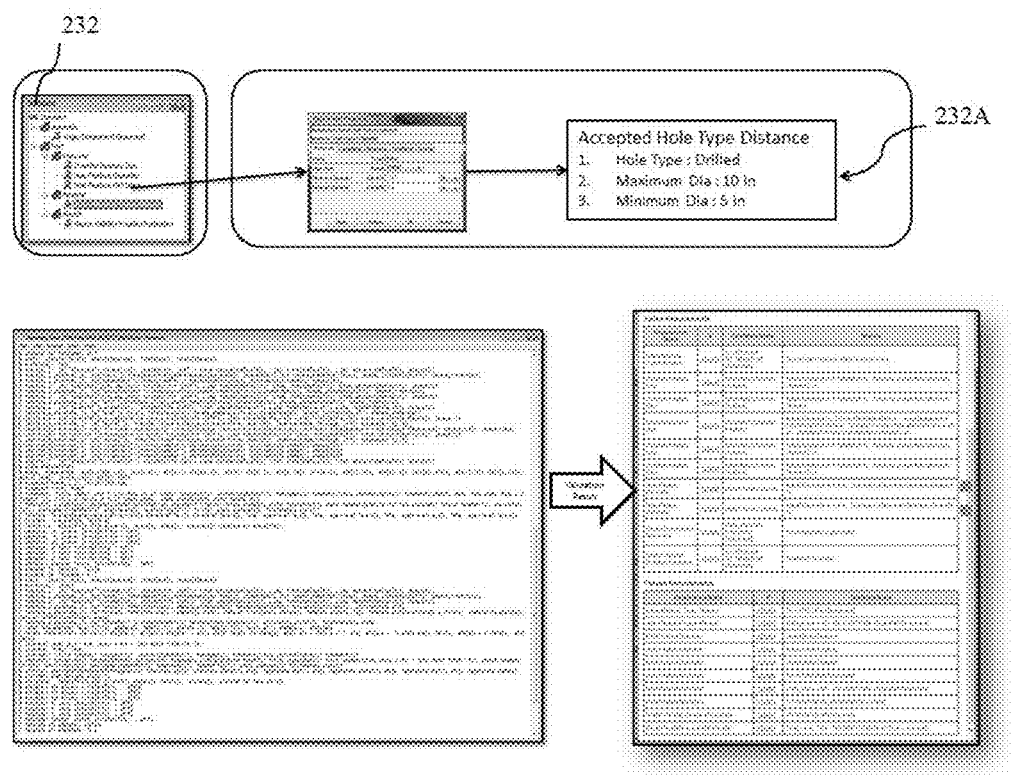
Figure 22:
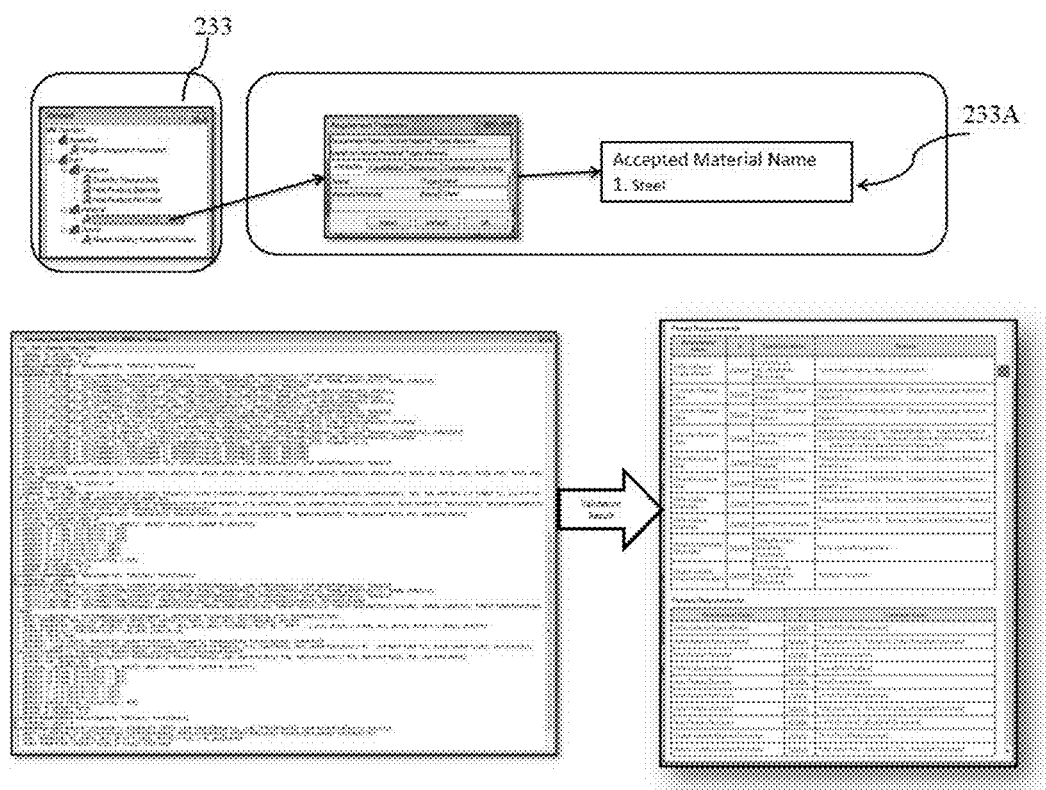
Figure 23:
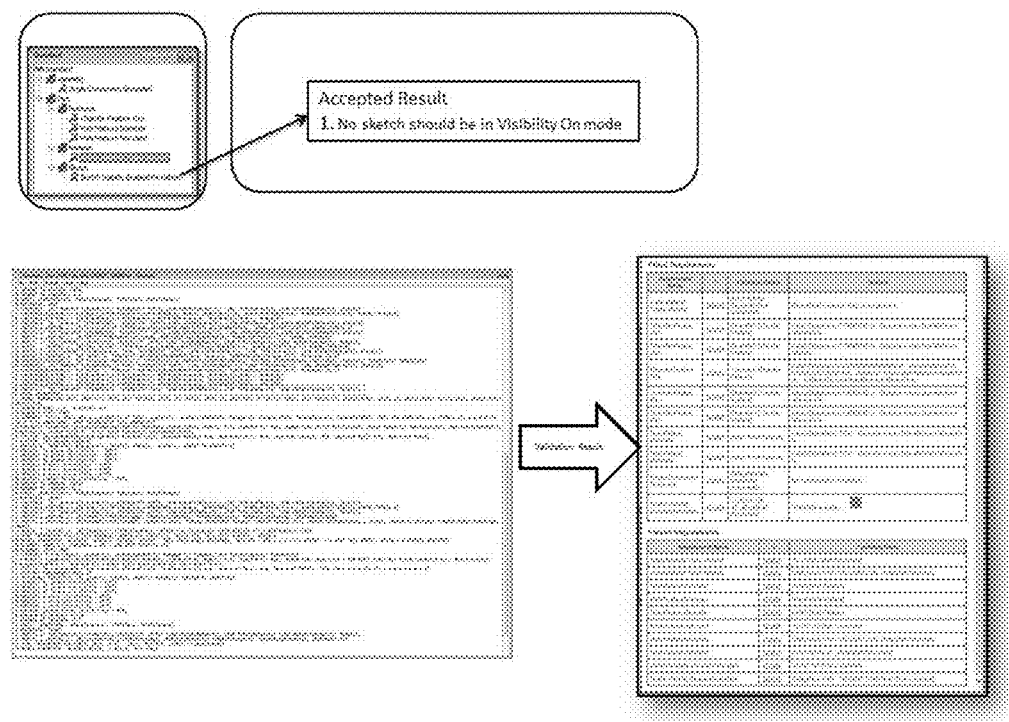
Figure 24:
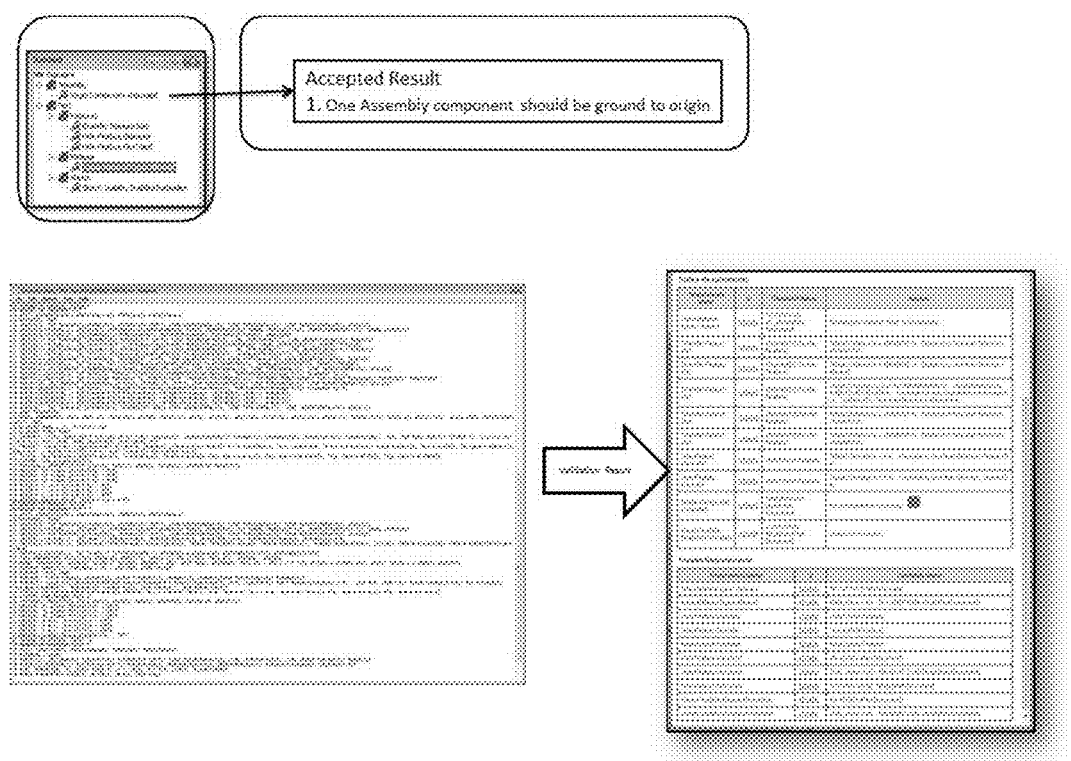
Figure 25:
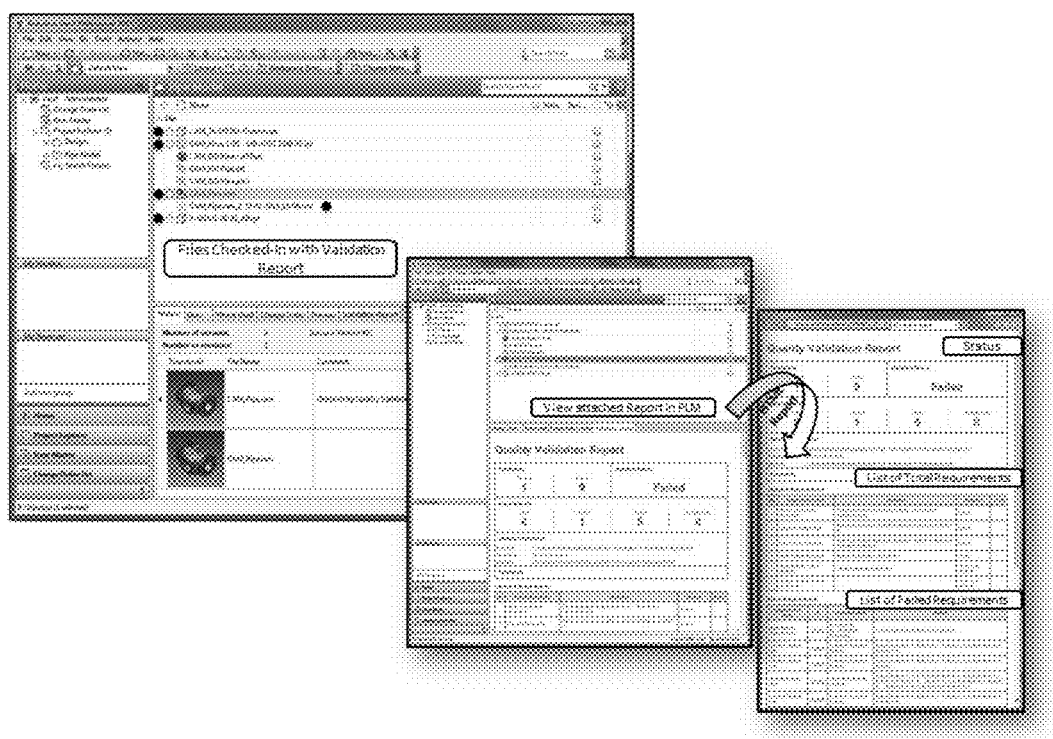

Check (226)—As shown in FIG. 9A, the engineering quality and validation tool (200), on invoking Check (226) causes the execution comprising the steps of:
a. opening the CAD file in the native CAD platform, (211); and as illustrated by FIG. 17.
b. triggering the CAD specific geometry extractor, (212).
c. reading the engineering information which is the CAD information, termed as a geometry extract and sending the information to the geometry extractor, (213); and as illustrated by FIG. 18;
d. encrypting a custom file of the geometry extract, (214); and as illustrated by FIG. 19;
e. sending the encrypted geometry extract to the Check Validator (250);
f. decrypting the geometry extract, (215);
g. validating the geometry extract with respect to the rules in the neutral standard, (216);
h. generating the Passed/Failed validation report, (217); and
i. Checking in the report and the CAD file in the PLM, (218);

FIG. 20 to FIG. 24 illustrate different checks as per a set variable and corresponding Passed/Failed validation report generated as (217) and the CAD file along with the report is uploaded in the PLM platform as illustrated by FIG. 25. The reason for disclosing several illustrations as in FIGS. 20 to 24 shall be evident shortly.

Figures 1, 9B:
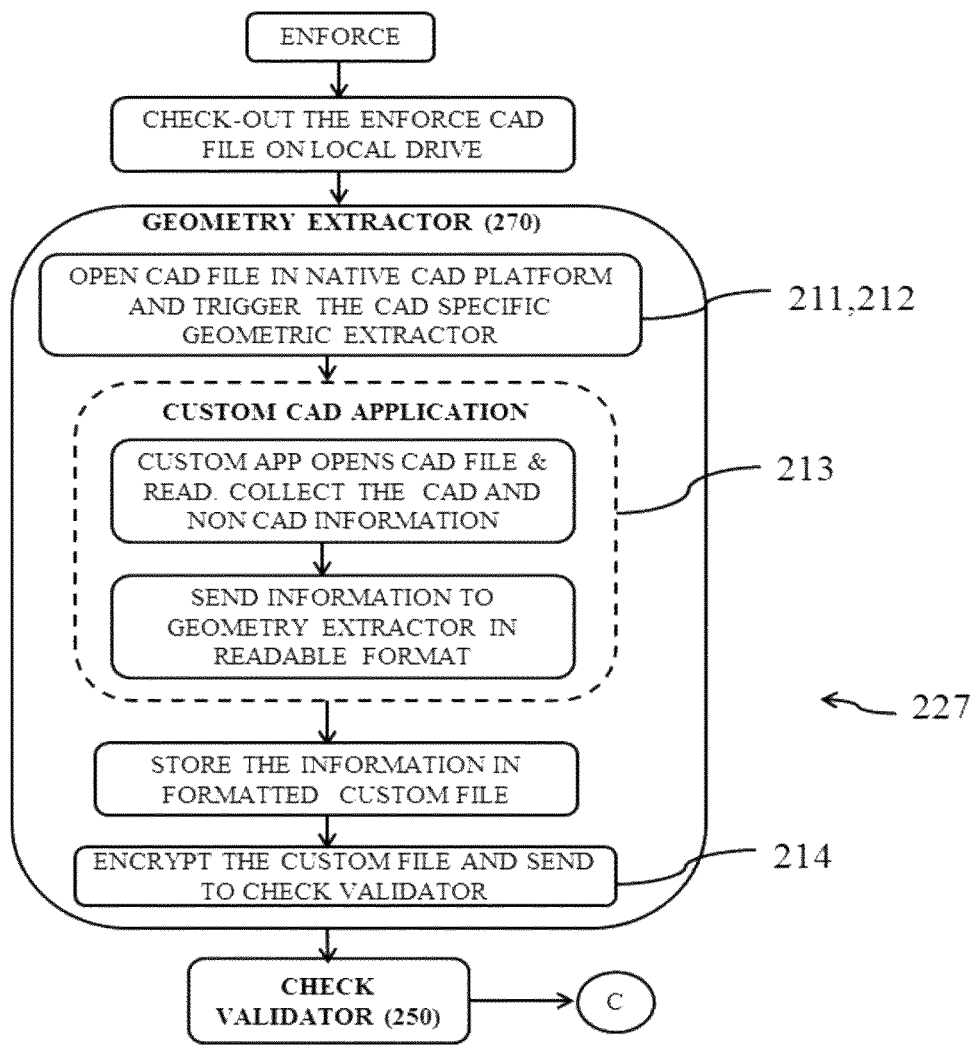
Figures 2, 9B:
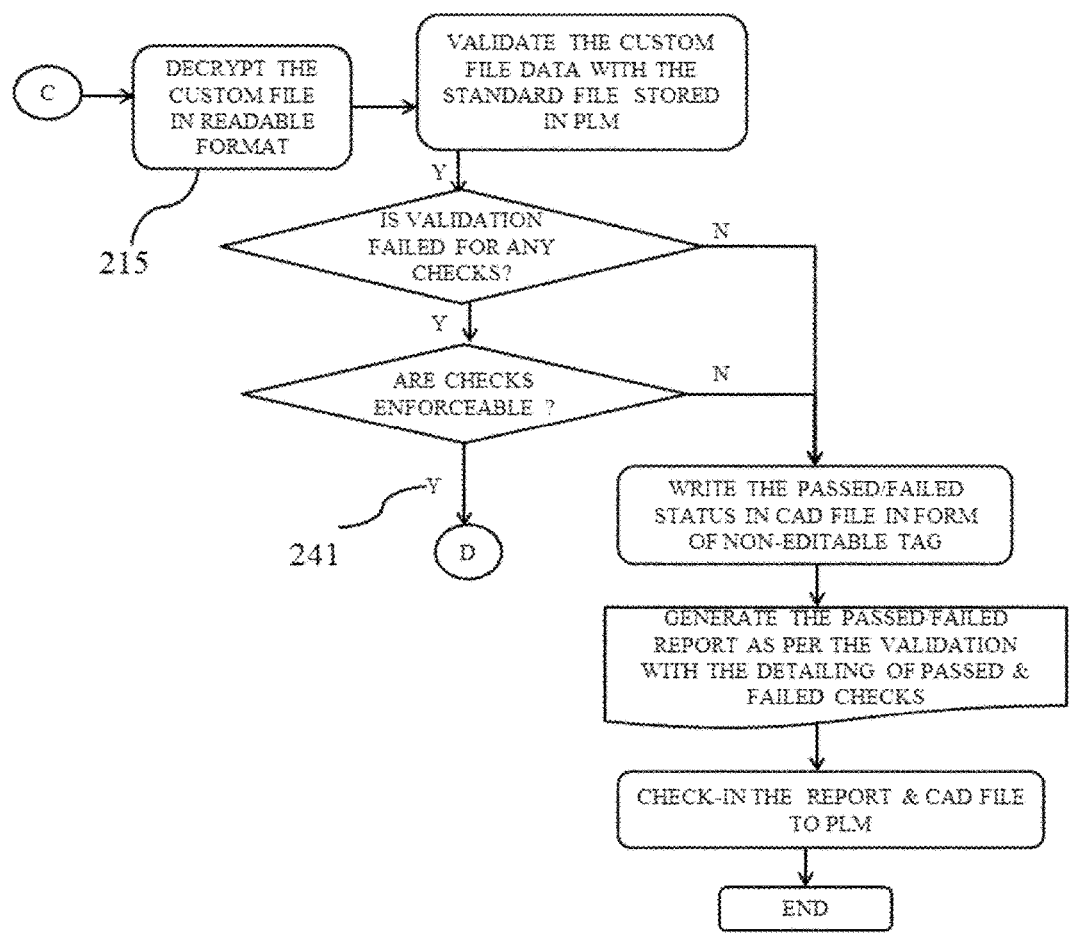
Figures 3, 9B:
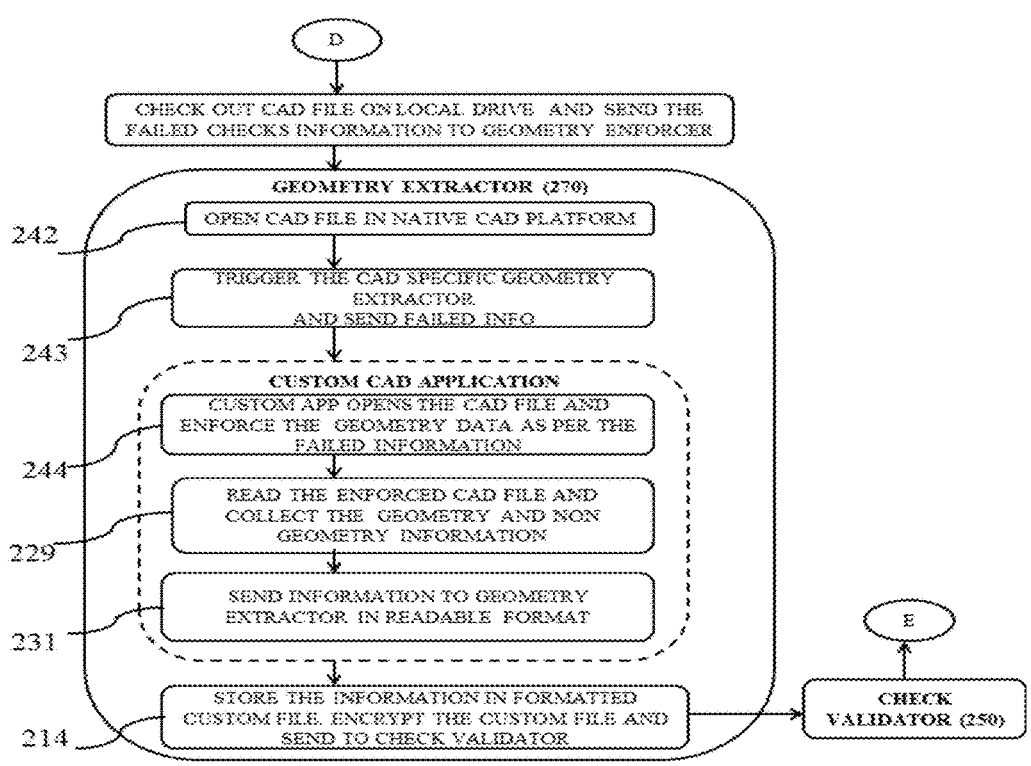
Figures 4, 9B:
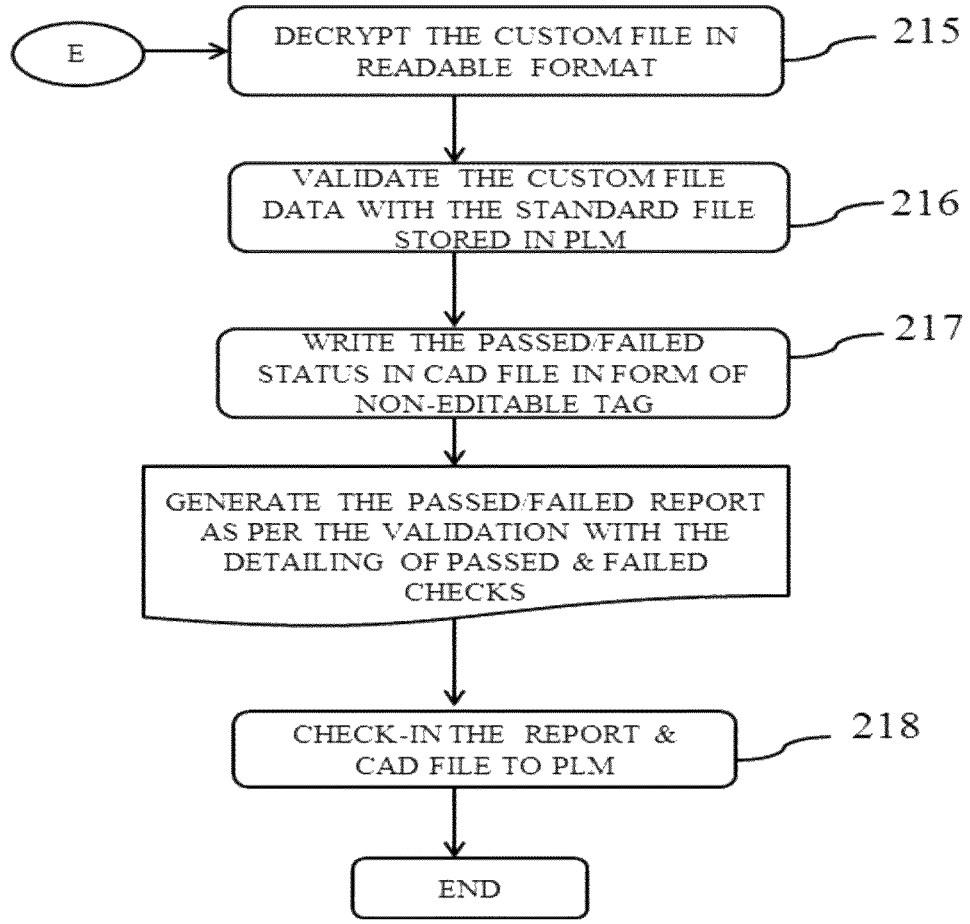
Figure 26:
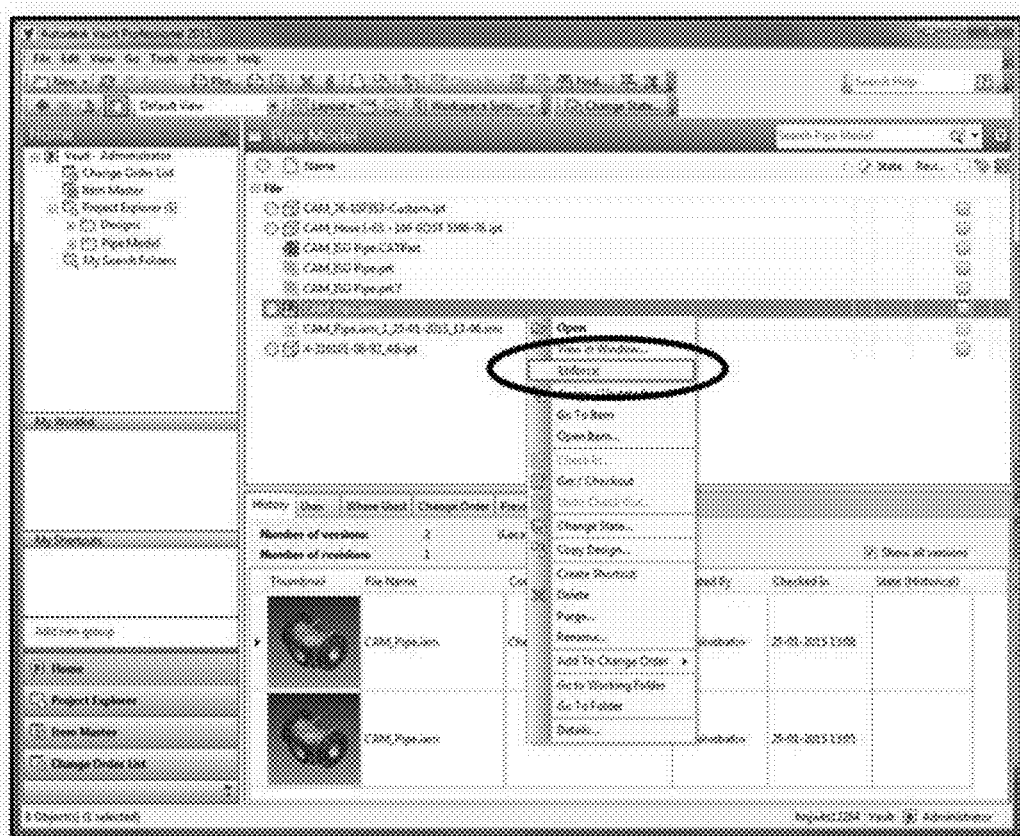
Figure 27:
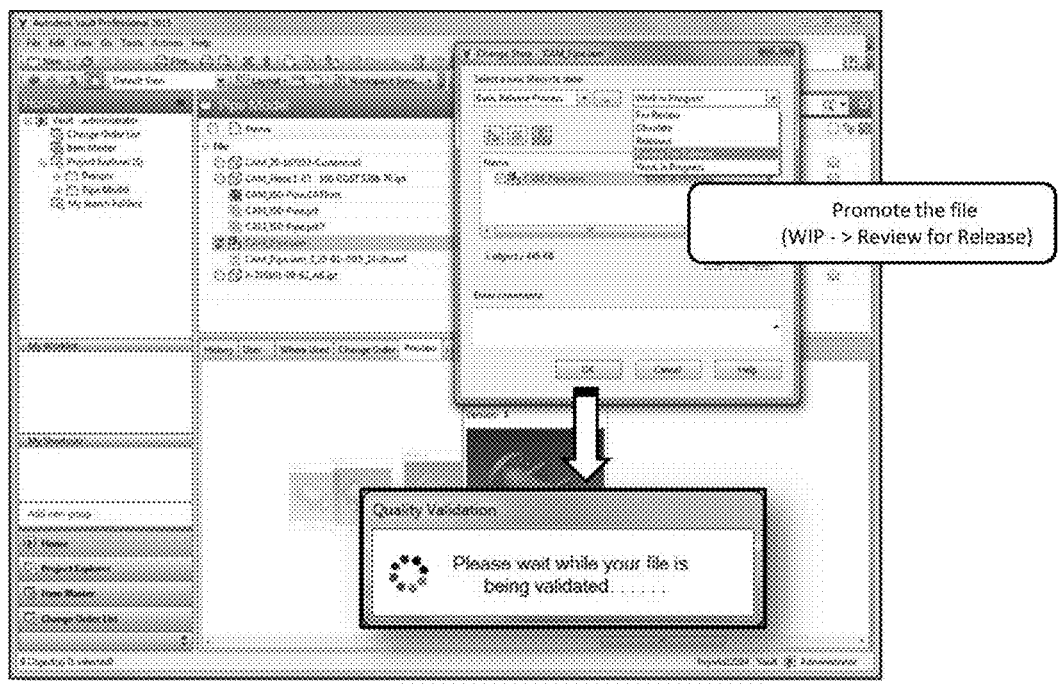
Figure 28:
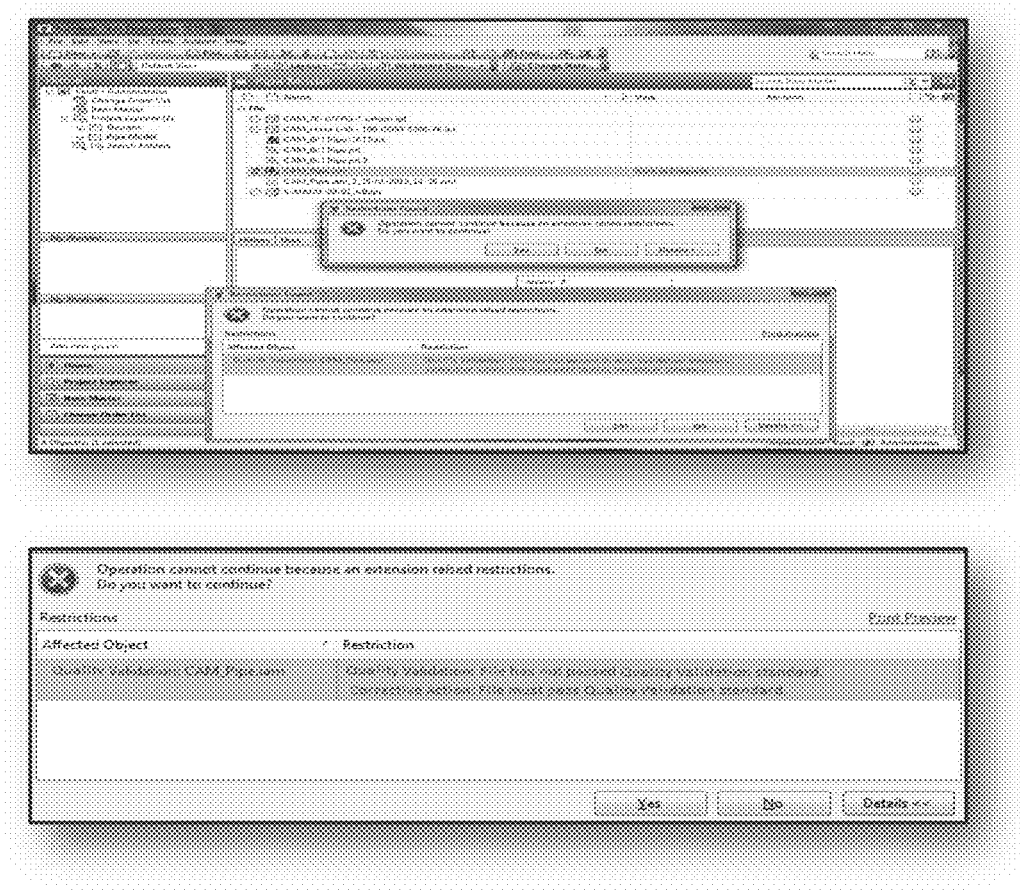

Enforce (227)—Certain checks, when failed, need intervention by a design engineer. On the other hand, there are possible failures which do not need design engineers' intervention and the quality validation (202) has the capability to make or enforce required corrections. A Chamfer feature size (231) in FIG. 20 having a band of acceptable numeric value (231A); and a Hole feature Diameter (232) in FIG. 21 having a range of acceptable numeric values (232A) are illustrations of checks, which, when failed, need design engineers' intervention. Active material type allotted (233) in FIG. 22 having a defined "string" value (233A) illustrates a check which, when failed, may be corrected by the engineering validation and audit tool (200) itself. Each check is classified as enforceable or not enforceable. As shown in FIG. 9B-1 to FIG. 9B-4, when the option Enforce is invoked as shown in FIG. 26, then the execution comprises the steps of:
a. opening the CAD file in the native CAD platform, (211);
b. triggering the CAD specific geometry extractor, (212);
c. reading the engineering information which is the CAD information, termed as a geometry extract and sending the information to the geometry extractor, (213);
d. encrypting a custom file of the geometry extract, (214);
e. sending the encrypted geometry extract to the Check Validator (250)
f. decrypting the geometry extract, (215);
g. validating the geometry extract with respect to the rules in the neutral standard, (216);
h. filtering enforceable checks out of failed checks (241) checking out the CAD file and sending the enforceable checks to the geometry extractor, by:
i. re-opening the CAD file in the native CAD platform (242)
j. triggering the CAD specific geometry extract to read the engineering information which is the CAD and CAD information, termed as a geometry extract; and send enforceable check information (243)
k. Enforcing the failed check information as to meet the rule requirement as per neutral standard check library (244)
l. triggering the CAD specific geometry extract to read the enforced engineering information which is the CAD and CAD information, termed as a geometry extract (229)
m. sending the information to the geometry extractor, (231);
n. encrypting a custom file of the geometry extract, (214);
o. sending the encrypted geometry extract to the Check Validator (250)
p. decrypting the geometry extract, (215);

q. validating the geometry extract with respect to the rules in the neutral standard, (216);
r. generating the Passed/Failed validation report, (217);
s. checking in the report and CAD file to the PLM (218)

Figures 1, 9C:
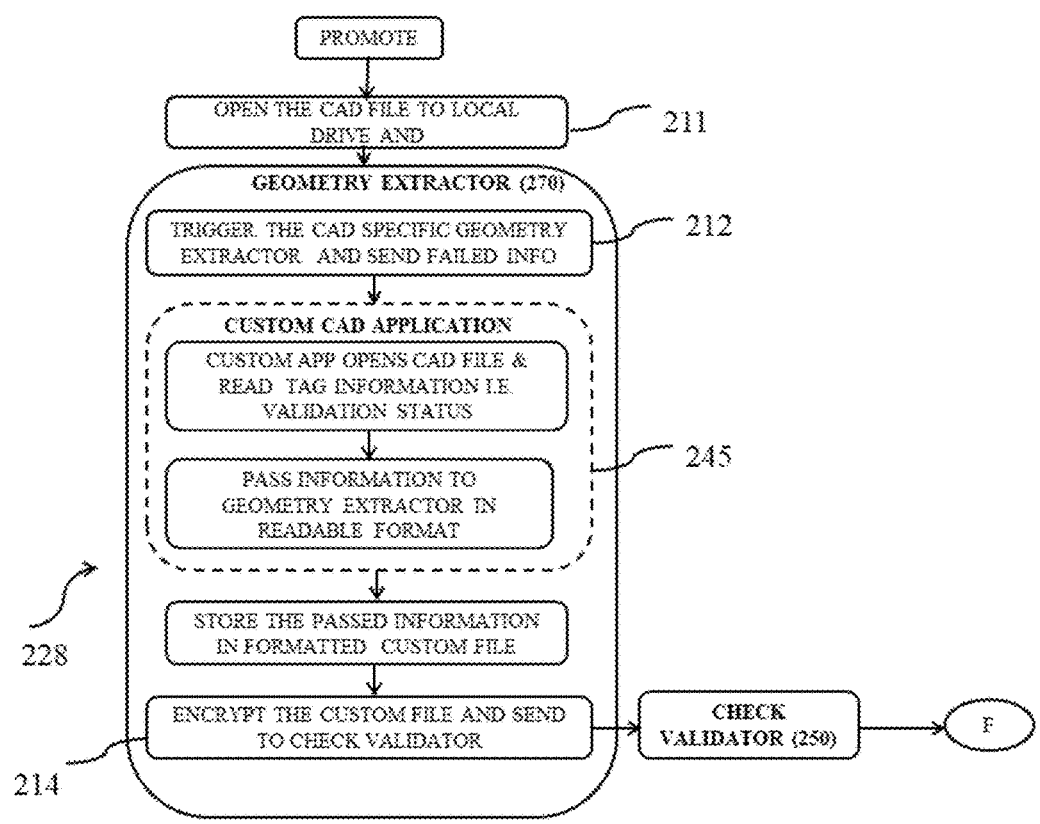
Figures 2, 9C:
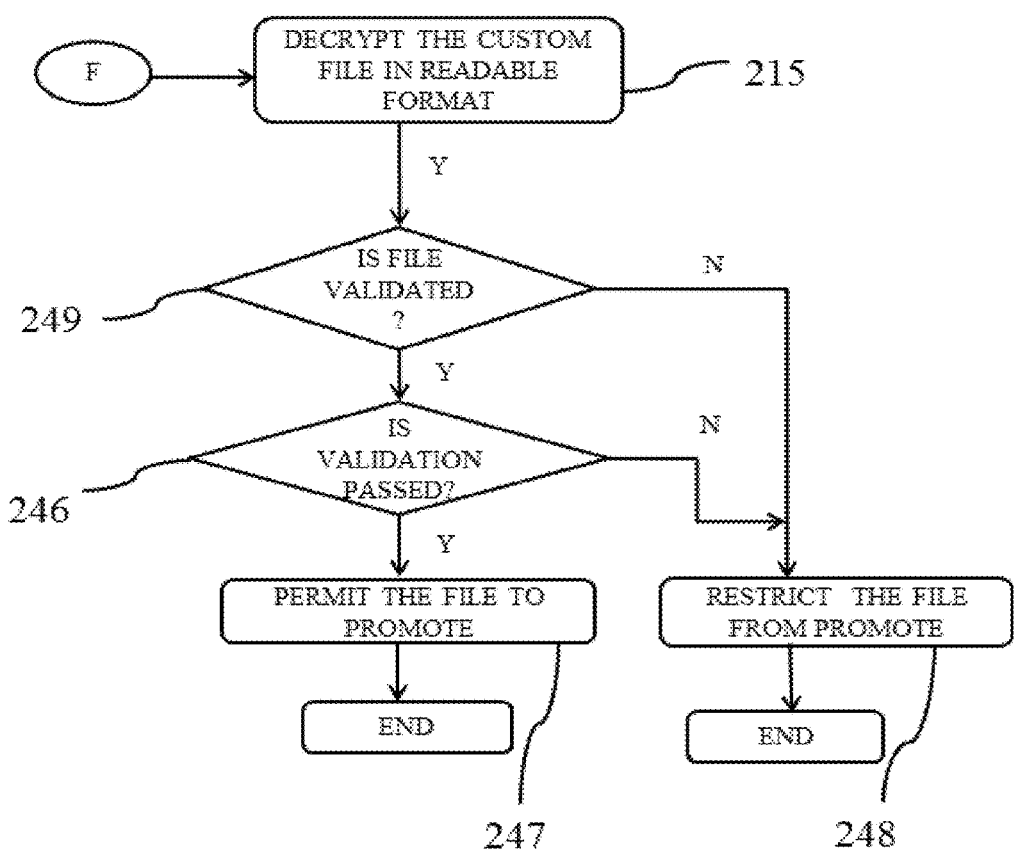
Figure 10:
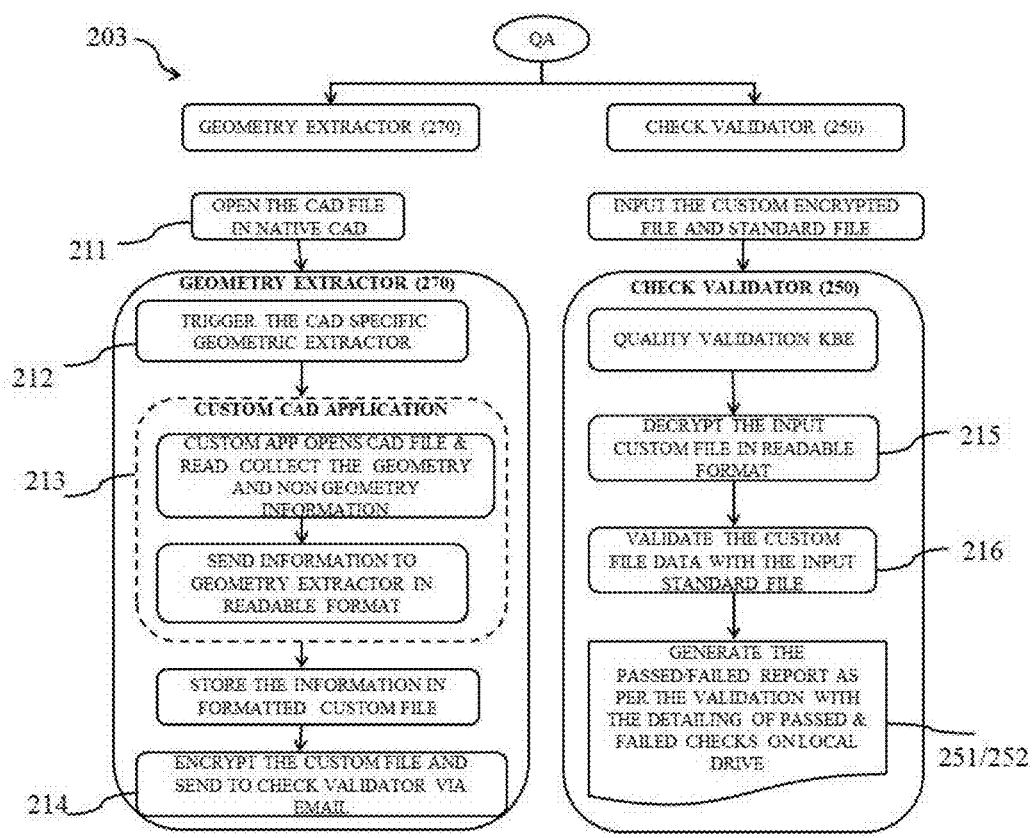
FIG. 10 gives in the form of a flow diagram the options of a quality audit.
Figure 11:
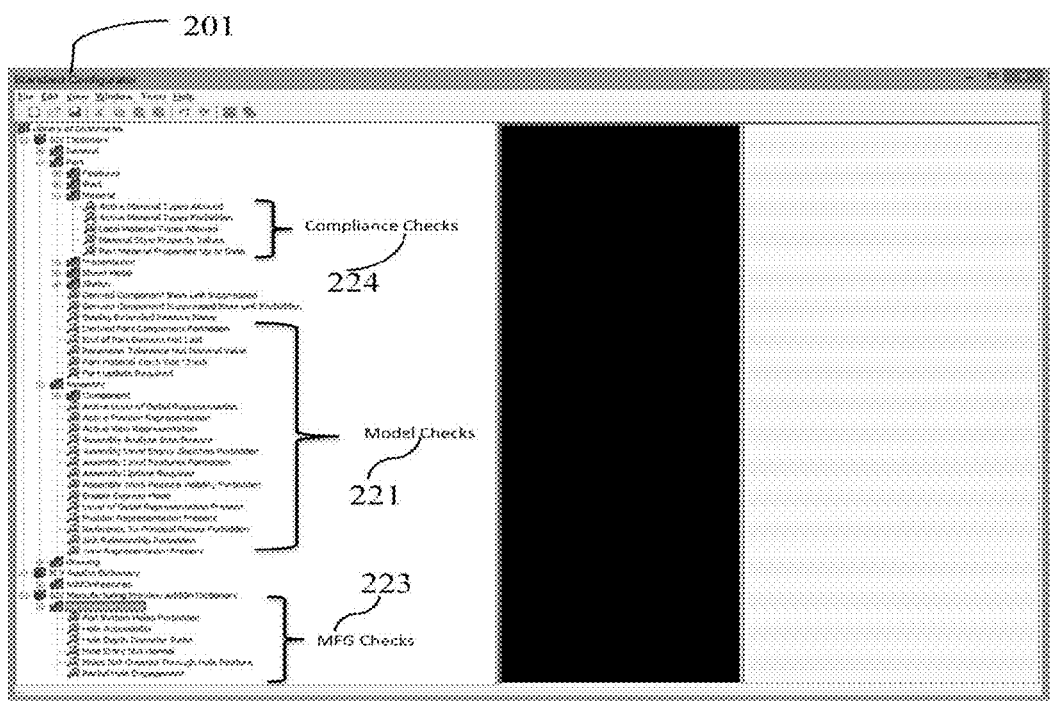
FIGS. 11, 12 and 13 give illustrative screen views of a Standard Configurator.
Figure 12:
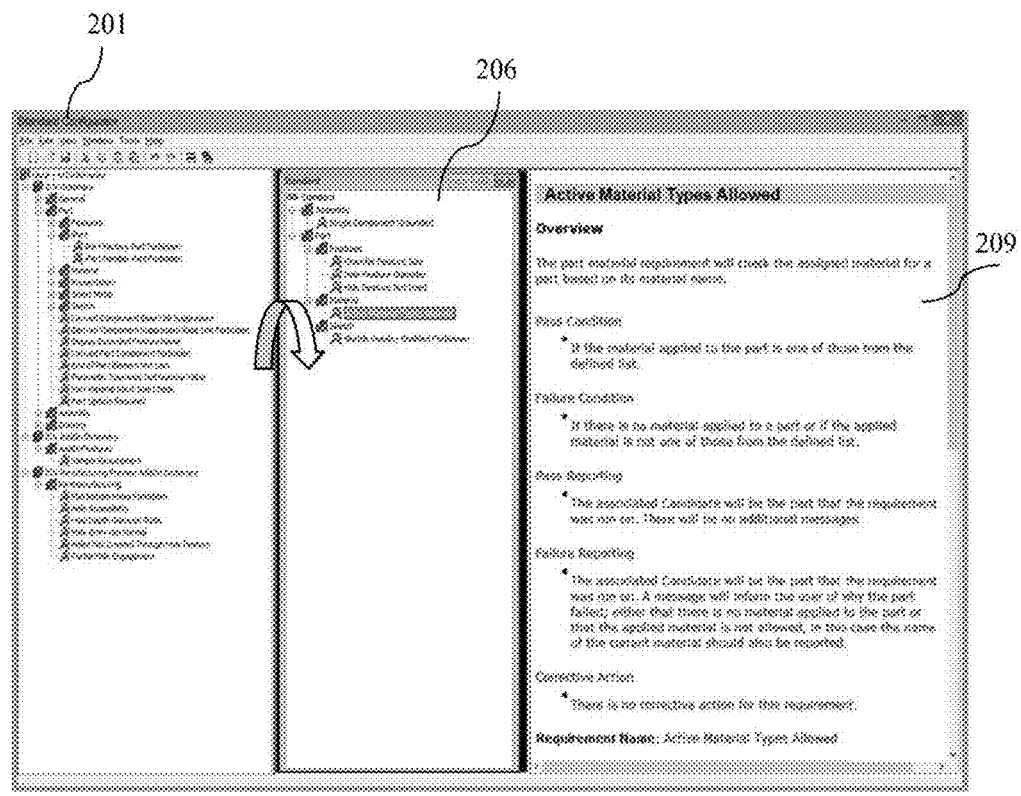
Figure 13:
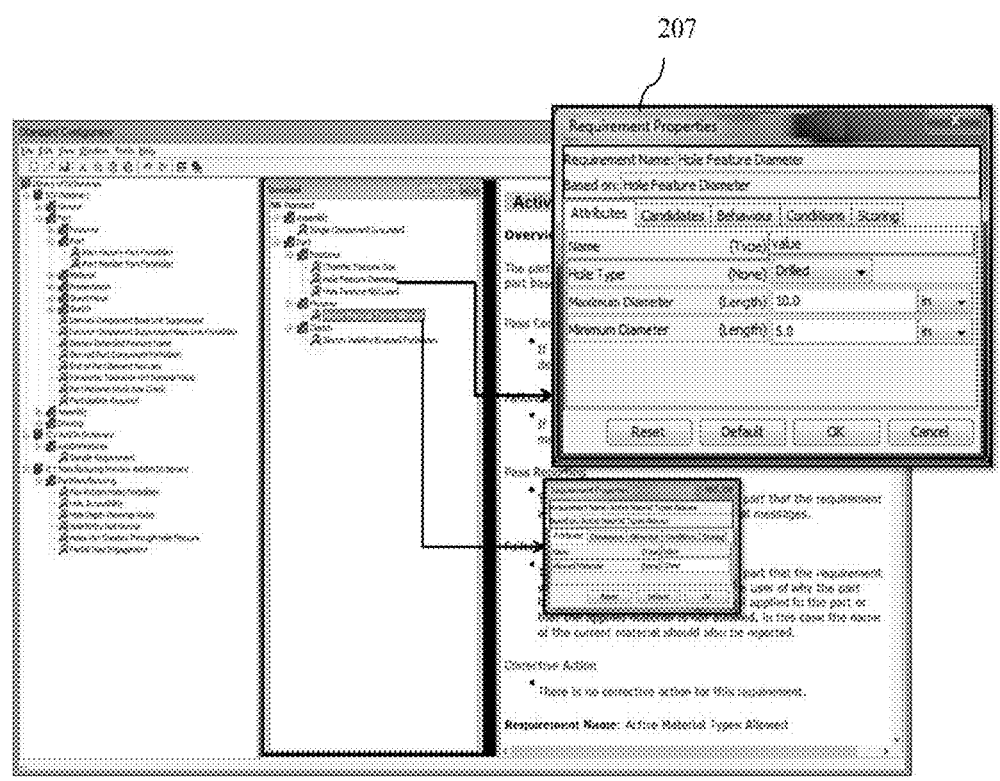

Execution of the Promote (228) as per FIG. 9C-1 to FIG. 9C-2 comprises the steps of:
a. opening the CAD file in the native CAD platform (211)
b. triggering the CAD specific geometry extractor (212)
c. reading the validation status of the engineering information which is the CAD information, termed as a geometry extract and sending the information to the geometry extractor (245)
d. encrypting a custom file of the geometry extract (214)
e. sending the encrypted geometry extract to the Check Validator
f. decrypting the geometry extract (215)
g. verifying whether the geometry extract is validated (249)
h. verifying whether all the checks as per the neutral standard are passed (246)
i. Permitting the status change to Promote (247) so as to make it accessible for further engineering deployment through PLM.
j. blocking the status change if the geometry extract is not validated and or any of the checks are failed (248)

FIG. 10 and FIGS. 29 to 33 describe and illustrate the Quality audit (203). The functional difference between a quality validation and a quality audit is that it is possible to keep the confidentiality of a CAD form and fit of the product design in case of the quality audit. The quality audit is executed in the first bifurcation which is the auditee side (200A) and the second bifurcation, which is the auditor's side (200B) as shown in FIG. 6.

Figure 29:
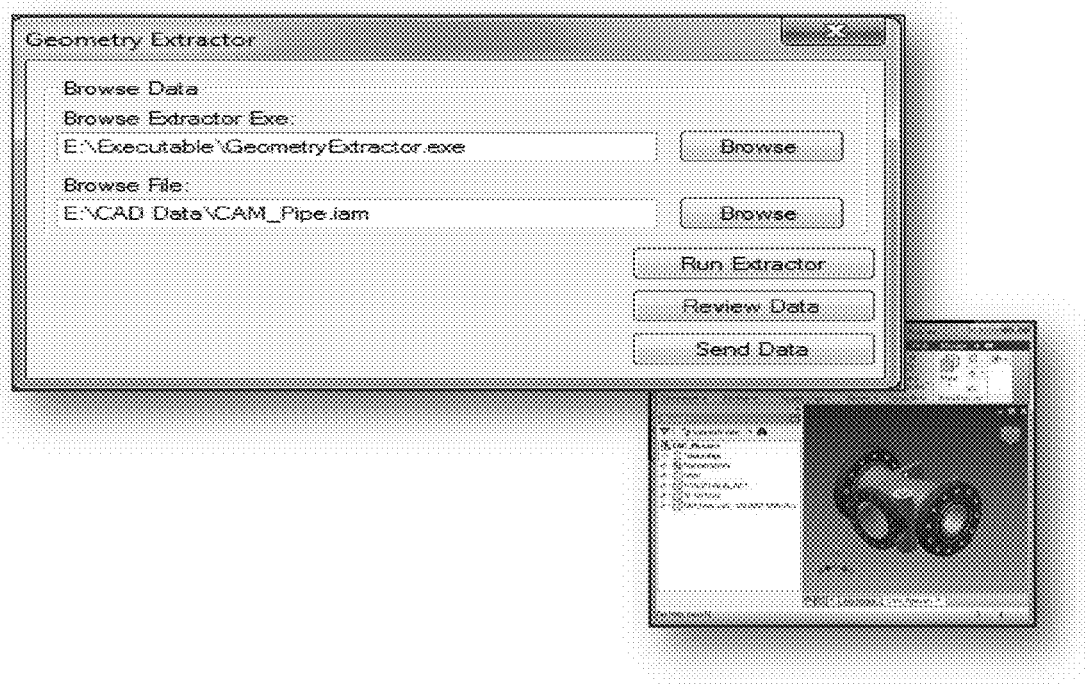
FIG. 29 to FIG. 33 give illustrative screen views of the Quality audit for the CAD information.
Figure 30:
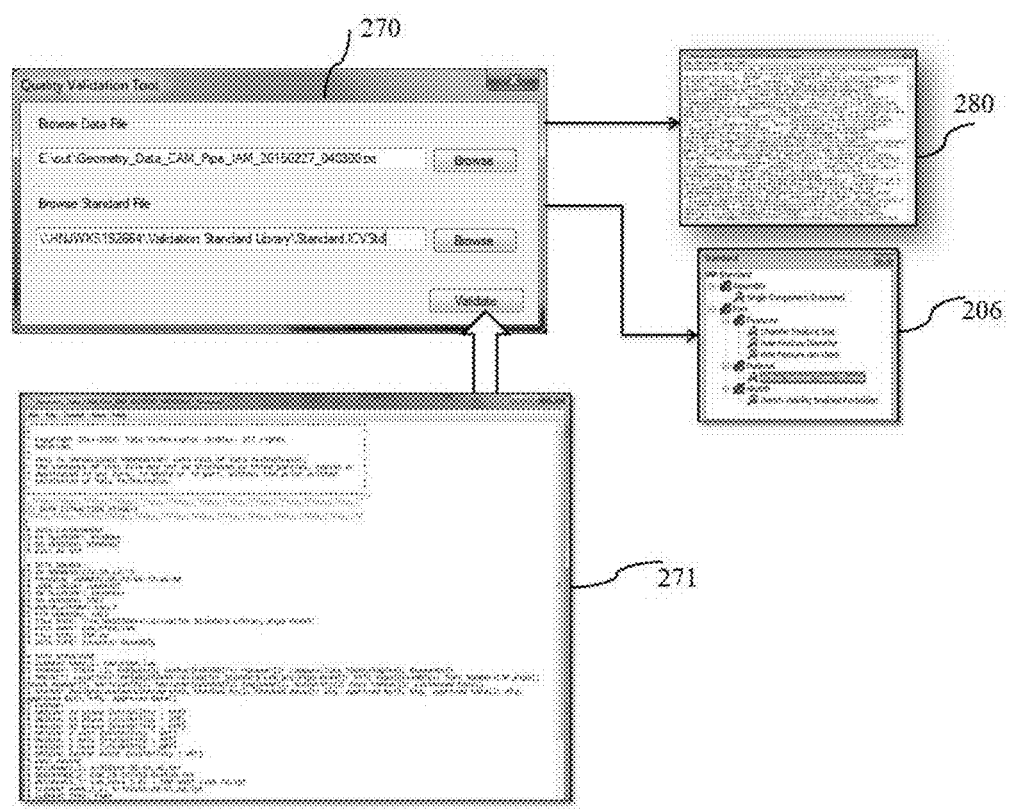
Figure 31:
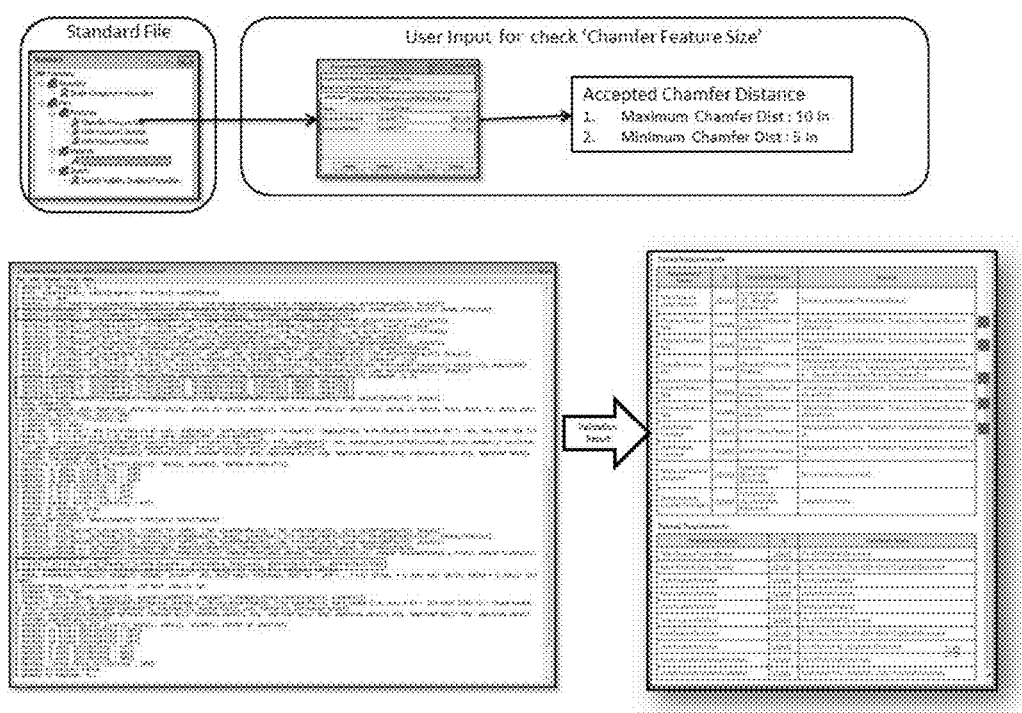

The execution of the first bifurcation comprises the steps of:
a. opening the CAD file in the native CAD platform (211).
b. triggering the CAD specific geometry extractor (212), and as shown in FIG. 29 and FIG. 30
c. reading the engineering information which is the CAD information, termed as a geometry extract and sending the information to the geometry extractor, (213);
d. encrypting a custom file of the geometry extract, (214); and as illustrated by FIG. 30
e. sending the encrypted geometry extract to the interface file
f. sending to the second bifurcation the second bifurcation comprising the steps of:
g. receiving the interface file
h. reading the encrypted geometry extract from the interface file
i. decrypting the geometry extract (215)
j. validating the geometry extract with respect to the rules in the neutral standard (216), and as per FIG. 31
k. generating the validation report (251/252), and as shown in FIGS. 31 and 32

The engineering quality and audit tool (200) "QRatr" is also usable for non-CAD information, available in MS-EXCEL, MS-ACCESS, ERP or any other manner executable by computers. The process for quality audit of non-CAD information remains the same as that of the CAD information and is illustrated by FIGS. 33 to 37.

Term "check" and "rule" is used interchangeably.
Term "PLM", "PLM tool" and "PLM platform" are used interchangeable.

The invention claimed is:

1. An engineering validation and audit tool in the form of a computer program installed on a workstation with a minimum of 64 bit operating system, NVIDIA Quadro 4000 2 GB GFX Special and equivalent, the engineering validation and audit tool being independent of any CAD platforms like CATIA, any Non-CAD platforms and/or PLM platforms like ENOVIA, the engineering validation and audit tool residing outside any CAD/PLM/Non-CAD platform and comprising of:
a. a Geometry Extractor producing a geometry extract from any CAD model in a form readable by a human as well as a computer;
b. a Check Validator decrypting an encrypted geometry extract and then applying a set of rules on a decrypted geometry extract and generating a result as a Validation Report with Pass or Fail Stamp along with a quality rating based on accumulation of multiplication of the Pass Count and a weightage;
c. a Neutral Universal Checks Library containing knowledge based rules and checks related to CAD as well as Non-CAD/PDM, readable by the engineering validation and audit tool;
d. an interface file;
e. a plurality of CAD specific interfaces;
f. a plurality of NON-CAD specific interfaces; and
g. a plurality of PLM specific interfaces,
the engineering validation and audit tool performs an execution of
I. a Standard Configurator;
II. a Quality validation; and
III. a Quality Audit being a bifurcated tool comprising a first bifurcation and a second bifurcation, the first bifurcation comprising of the plurality of CAD specific interfaces; the plurality of NON-CAD specific interfaces; the Geometry Extractor; and the interface file; and the second bifurcation comprising of the interface file, the Check Validator; the Neutral Universal Checks Library; and the plurality of PLM specific interfaces,
the quality validation performs the execution of
i. Check
ii. Enforce
iii. Promote
a CAD specific interface reads an engineering information from an application program interface (API) of the corresponding CAD platform; a Non-CAD specific interface reads an engineering information from an application program interface (API) of the corresponding Non-CAD platform; and pass on to the Geometry Extractor in a proprietary neutral format; the engineering information, which is platform independent, resides in the Geometry Extractor and a plurality of engineering rules, having a weightage, reside in the Check Validator, the quality audit executed in the first bifurcation which is an auditee's side and a second bifurcation, which is an auditor's side.

2. The engineering validation and audit tool as claimed in claim 1, wherein the quality validation is an integrated tool comprising of the Geometry Extractor; the Check Validator; the Neutral Universal Checks Library; the interface file; the plurality of CAD specific interface; the plurality of NON-CAD specific interface; and the plurality of PLM specific interfaces.

3. The engineering validation and audit tool as claimed in claim 1, wherein the Standard Configurator stores a set of checks comprising of a plurality of model checks, a plurality of design checks, a plurality of manufacturing checks, a plurality of compliance checks and/or a plurality of integrity checks.

4. The engineering validation and audit tool as claimed in claim 1, wherein the standard configurator has a guideline pre-stored corresponding to each check.

5. The engineering validation and audit tool as claimed in claim 3, wherein the plurality of design check has a variable part that is editable.

6. The engineering validation and audit tool as claimed in claim 1, wherein the weightage of the engineering rules is editable.

7. The engineering validation and audit tool as claimed in claim 1, wherein the engineering validation and audit tool is a stand-alone computer program installed on a specific hardware and or workstations which support industrial CAD and PLM platforms.

8. The engineering validation and audit tool as claimed in claim 1, wherein the CAD specific interface and the non-CAD specific interface resides as a standalone computer program on a specific hardware and or workstations which support the CAD platforms and the non-CAD platforms so as to open CAD files in a native CAD platform, and to open a non-CAD files in a native non-CAD platform.

9. A workstation comprising a minimum of 64 bit operating system, NVIDIA Quadro 4000 2 2 GB GFX Special and equivalent, wherein the workstation is configured to execute an engineering validation and audit tool in the form of a computer program installed on the workstation, the engineering validation and audit tool being independent of CAD platforms, Non-CAD platforms and/or PLM platforms and residing outside any CAD/PLM/Non-CAD platform, a quality audit by the engineering validation and audit tool is executed in a first bifurcation and a second bifurcation;
the first bifurcation comprising executing on an auditee's side the steps of:
a. extracting an engineering information through a CAD specific geometry extractor, and or, through a non-CAD specific extractor;
b. producing a Geometry Extract in a form readable by a human as well as a computer;
c. encrypting a custom file of the geometry extract;
d. sending an encrypted geometry extract to the interface file;
e. sending to the second bifurcation;
the second bifurcation comprising executing on an auditor's side the steps of:
f. receiving the interface file;
g. reading the encrypted geometry extract from the interface file;
h. decrypting the geometry extract;
i. applying rules on the decrypted geometry extract;
j. generating result as a Validation Report with a Pass or a Fail Stamp and a quality rating.

* * * * *